(12) United States Patent
Madatov et al.

(10) Patent No.: US 7,840,394 B2
(45) Date of Patent: Nov. 23, 2010

(54) METHOD FOR GENERATING A 3D EARTH MODEL

(75) Inventors: Arkady G. Madatov, Murmansk (RU); Algirdas-Vladimir I. Sereda, Murmansk (RU)

(73) Assignee: Schlumberger Technology Corporation, Sugarland, TX (US)

( * ) Notice: Subject to any disclaimer, the term of this patent is extended or adjusted under 35 U.S.C. 154(b) by 349 days.

(21) Appl. No.: 11/628,148

(22) PCT Filed: Jun. 1, 2005

(86) PCT No.: PCT/EP2005/005890

§ 371 (c)(1), (2), (4) Date: Dec. 1, 2008

(87) PCT Pub. No.: WO2005/119298

PCT Pub. Date: Dec. 15, 2005

(65) Prior Publication Data

US 2009/0119076 A1     May 7, 2009

(30) Foreign Application Priority Data

Jun. 3, 2004    (RU)   ............................... 2004116907

(51) Int. Cl.
     *G06F 9/455*      (2006.01)
(52) U.S. Cl. ....................................................... 703/10
(58) Field of Classification Search .................... 703/10; 250/256; 166/250.15, 258; 702/14
See application file for complete search history.

(56) References Cited

U.S. PATENT DOCUMENTS 4,340,934 A    7/1982   Segesman
(Continued)

FOREIGN PATENT DOCUMENTS

| | | |
|---|---|---|
| EP | 1070970 | 1/2001 |
| RU | 2115092 | 7/1998 |
| RU | 2142162 | 11/1999 |
| WO | 99/28767 | 6/1999 |

OTHER PUBLICATIONS

Tuncay et al, "Sedimentary basin deformation: an incremental stress approach", Technophysics, 2000.*

(Continued)

*Primary Examiner*—Paul L Rodriguez
*Assistant Examiner*—Kandasamy Thangavelu
(74) *Attorney, Agent, or Firm*—Dann, Dorfman, Herrell & Skillman

(57) ABSTRACT

A method is provided for generating an invertible 3D hydrodynamic earth model suitable for defining target characteristics of a subsurface area formed by a plurality of formations and comprising drilling positions of potential and real wells. The method comprises constructing an initial 3D earth model by combining solutions for a set of single 1D models, each of the models corresponding to a real or potential well drilling position and covering the entire respective aggregate of formations along the wellbore, with solutions for a relevant set of 2D earth models which are constructed only for single formations, and optimizing the constructed initial 3D earth model by defining an optimal set of formations and an optimal set of calibratable model parameters. A method and system are also provided for application of the earth model construction method for predicting overpressure evolution before and during drilling. As the earth model constructed in accordance with the above method provides efficient inversion of data, in particular gathered while drilling, the prediction can be updated in real-time while drilling. The invention can ensure optimization of the drilling process and improves its safety.

24 Claims, 14 Drawing Sheets

U.S. PATENT DOCUMENTS

| | | | | |
|---|---|---|---|---|
| 5,675,147 | A | * | 10/1997 | Ekstrom et al. ............. 250/256 |
| 5,706,194 | A | | 1/1998 | Neff et al. |
| 5,764,515 | A | | 6/1998 | Guerillot et al. |
| 6,430,507 | B1 | | 8/2002 | Jorgensen et al. |
| 2002/0103630 | A1 | * | 8/2002 | Aldred et al. ................. 703/10 |
| 2003/0060981 | A1 | * | 3/2003 | Routh et al. .................. 702/14 |
| 2003/0110018 | A1 | * | 6/2003 | Dutta et al. ................... 703/10 |
| 2004/0244972 | A1 | * | 12/2004 | Sayers et al. ........... 166/250.15 |

OTHER PUBLICATIONS

Tandon et al., "Estimating tectonic history through basin simulation-enhanced seismic inversion: geoinformatics for sedimentary basins", International Journal of Geophysics, 2004.*

Stump, B.B, "Illuminating basin fluid flow in Eugene Island 330 (Gulf of Mexico) through in situ observations—deformation experiments and hydrodynamic modeling", The Pennsylvania State University, 1998.*

N.C. Dutta, Geopressure prediction using seismic data: Current status and the road ahead, Geophysics, vol. 67, No. 6 (Nov-Dec. 2002), pp. 2012-2041.

M.W. Alberty et al., Emerging Trends in Pressure Prediction, Offshore Technology Conference, Houston, TX (May 5-8, 2003).

T.M. Guidish et al., Basin Evaluation Using Burial History Calculations: an Overview, The American Association of Petroleum Geologies Bulletin, vol. 69, No. 1 (Jan. 1985), pp. 92-105.

I. Lerche, Theoretical aspects of problems in basin modelling, Basin Modelling: Advances and Applications, Norwegian Petroleum Society, Special Publication 3, Elsevier, Amsterdam (1993), pp. 35-65.

A.G. Madatov et al., The decomposition of 3-D overpressure evolution model in a basin scale and its application to the fault seal analysis, Proceedings of the Murmansk State Technical University, vol. 4, No. 1, (2001), pp. 79-96.

S. Pfleiderer et al., 3D-visualisation of Vienna's subsurface, CORP2004 & Geomultimedia 04, 9th International Symposion on Planning & IT, Vienna, Austria (Feb. 2004).

D. Marion et al., Constraining 3D static models to seismic and sedimentological data: a further step towards reduction of uncertainties, SPE European Petroleum Conference, Paris, France (Oct. 24-25, 2000).

A.G. Madatov et al., The forward and inverse problems of the fluid dynamics in basin modeling applied to the pore pressure prediction within the sedimentary basins, Proceedings of the Murmansk State Technical University, vol. 3, No. 1, (2000), pp. 89-114.

A.G. Madatov et al., Pore Pressure Prediction by Using Inversion Before and During Drilling, scientific report at Symposium, New methods and technologies in petroleum geology, drilling and reservoir engineering, Krakov, Poland (Jun. 19-20, 1997).

K. Magara, Compaction and Fluid Migration, Practical Petroleum Geology, Elsevier Scientific Publishing Company (1978), Chap. 5, pp.119-142.

K. Terzaghi et al., Soil Mechanics in Engineering Practice, 1967, pp. 556-569.

B.A. Eaton, The Equation for Geopressure Prediction from Wells Logs, Society of Petroleum Engineers of AIME, Paper No. SPE 5544, American Institute of Mining, Metallurgical, and Petroleum Engineers, Inc. (1975).

* cited by examiner

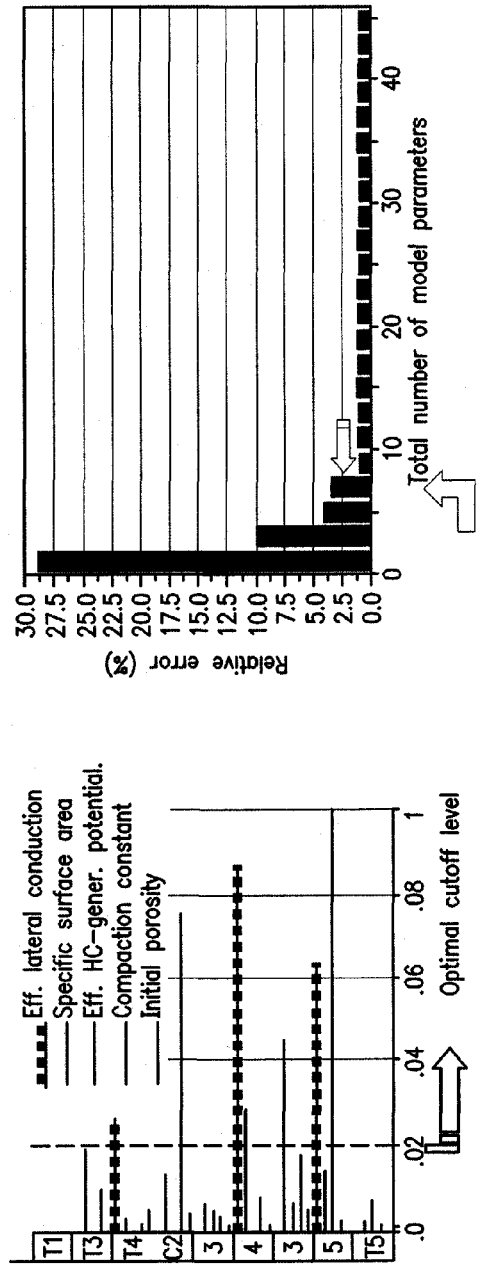
FIG. 8a
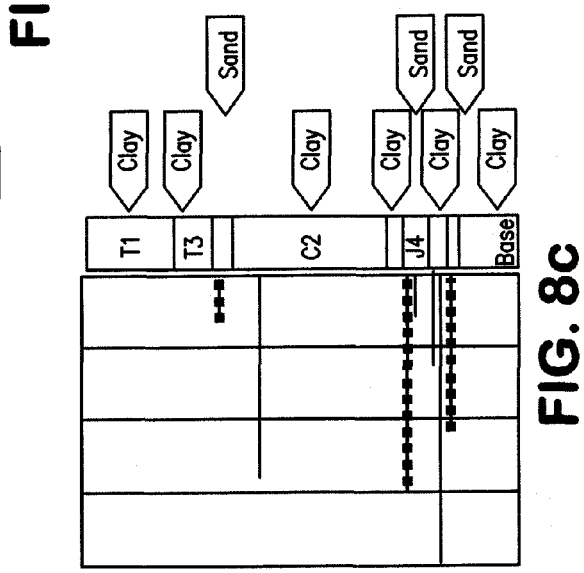
FIG. 8b
FIG. 8c

METHOD FOR GENERATING A 3D EARTH MODEL

FIELD OF THE INVENTION

The present invention relates generally to geo-physical analysis carried out in an effort to optimize the drilling process, and more particularly, but not exclusively, to a method for generating and using a 3D hydrodynamic earth model for predicting evolution of over hydrostatic formation pressure (overpressure) before and during drilling.

BACKGROUND OF THE INVENTION

To minimize the risks associated with the drilling process, particular significance is presently attached to optimal planning of drilling process, in particular for oil and gas deposits where high-temperature high-pressure conditions are probable. A standard practice is to construct a mathematical Earth model for a subsurface area of interest so as to predict the evolution of target characteristics and properties during drilling process on the basis of the model and available log data. The model-based prediction is used for optimization of the drilling process. To provide accurate prediction, the earth model should preferably allow calculations directly in the drilling process, i.e. in real-time, and enable earth model calibration or adjustment while drilling on the basis of log data acquired in the drilling process, so as to permit prediction not only before, but also in real-time during the drilling process.

Presently there are two groups of standard technologies aimed at overpressure simulation, investigation and prediction: a first group is based on methods of estimating unidimensional (along the wellbore profile) distribution of pore pressure, and a second group is based on 3D basin model solutions. The overpressure is a part of the rock pressure distributed to the fluid component of sedimentary rock, wherein the fluid component refers to liquid and/or gas component of the rock.

A first approach (see e.g. Magara K., Compaction and fluid migration, 1978, Elsevier Scientific Publishing Company, p. 319) uses empiric relationships between overpressure and porosity-sensitive well log and/or seismic data. Besides inherent low resolution and signal/noise restrictions of seismic reflections accessible in target intervals (2-4 km) (see e.g. Dutta N. C., Geopressure prediction using seismic data: current status and the road ahead. Geophysics, 2002, volume 67, No. 6, p.p. 2012-2041), the common shortcomings of all existing empiric methods are their restricted validity and non-adaptive framework. A main reason for this is the formal data fitting concept implemented therein. The quality of the background model in this concept has secondary priority in comparison with the uniqueness and speed of data transformations (type of fitting functions, method of approximation, flexibility, etc.) predefined in an empiric formula. From the geo-fluid system analysis point of view, the background earth models in this strategy are often oversimplified and inadequate. By way of example, the classic uniaxial effective stress approaches (see e.g. Terzaghi K., Peck R. B., Soil Mechanics in Engineering Practice, 1948, Wiley, New York, 566 page, or Eaton B. A., The Equation for Geopressure Prediction from Well Logs, 1975, SPE paper 5544) are essentially a unidimensional (1D) static approximation of a complex multi-mechanism phenomenon that gives rise to overpressure.

Modern modifications of these classic methods improve their flexibility, but do not change the focus onto rock compaction phenomena (Alberty R. W., Emerging trends in pressure prediction, scientific report at Offshore Technology Conference, May 5-8, 2003, Huston, USA, OTC 15290). The relevant earth models have significant restrictions of validity in depth, formation age and formation lithology; namely, they may be applicable only for shallow parts of sections represented by young and mostly clay sediments. However, the formation pressure and associated parameters of sedimentary rock essentially result from a combined effect of fluid retention and expansion mechanisms. The contributions of different factors change during sedimentation history, and within a single formation from one position to another. Therefore, no parameter influencing final formation pressure can be fixed by empirical formula-based approach. So, the typical problems rising before each prediction based on the first group of approaches relate to poor understanding of overpressure mechanisms acting within the area and lack of ways to give priority to the key coefficients.

The basin model based technologies, in contrast with the first group of methods, are based on a geo-fluid system analysis approach. This involves much more sophisticated dynamical Earth models (Guidish T. M., Kendall C. G. St. C., Lerch I., Toth D. J., Yarzab R. F., Basin Evaluation Using Burial History Calculations: an Overview. The American Association of Petroleum Geologists Bulletin, 1985, volume 69, No. 1, pages 92-105; Learch I., Theoretical Aspects of problems in basin modeling in "Basin Modelling Advances and Applications" 1990, Norwegian Petroleum Society, Special publication 3, Elsevier, Amsterdam, p.p. 35-65) which are based on differential operators describing global and local processes in basin time scale. The basin time scale, also referred to as geological time scale, is a time scale expressed in millions of years with time-step intervals from tens to hundreds of thousands of years. The use of well-grounded physical and chemical laws and respective model assumptions ensure that this approach exploits and encapsulates a deeper understanding of the present-day geo-fluid system state and in particular overpressure phenomena.

Still successful use of basin models for prediction of geo-fluid system properties and in particular for pre-drill overpressure prognosis with real-time drilling applications has been problematic to achieve up to now. The reason for this is the mathematical complexity of the relevant forward modeling operators and the absence of an adequate link between the calibration data and tunable model parameters. In other words, basin model solutions appear to be rather cumbersome for calibration by inverting data in terms of model parameter requirements (grid dimension, linear independence of parameters, etc.) and computational complexity of relevant 3D forward modeling operators. In addition, non-linear behavior of relevant forward model operators defined on regular 3D grids takes place because of the need to specify multiple dependent model parameters for each cell. Thus, conventional full-scale 3D basin models cannot be used in real-time.

Consequently there is a need for a method for generating a 3D earth model, which method would combine advantages and overcome shortcomings of the known approaches described above, in particular which could allow construction of an earth model suitable for real-time calculations, like empiric models, and have adequate validity, like basin models, and enable real-time data inversion.

SUMMARY OF THE INVENTION

An object of the present invention is to provide a method for generating a (preferably invertible) 3D hydrodynamic earth model for analysis and investigation of geo-fluid systems, and for the prediction of the evolution of target characteristics in the area of interest. Preferably the model is adjustable in real-time.

Accordingly, in one aspect the present invention provides a method for generating a 3D earth model for determining at least one characteristic of an area formed by a plurality of formations and comprising drilling positions of real or planned wells, the method comprising the steps of:

constructing an initial 3D earth model on the basis of measurement data and known properties of the area by combining solutions for a set of single 1D earth models with solutions for a set of 2D earth models, each of the 1D earth models corresponding to a drilling position of a real or planned well and covering formations along the bore of the respective well, and each of the 2D earth models covering a formation covered by at least one of the 1D earth models; and optimizing the constructed initial 3D earth model by:
(i) determining an optimal set of formations for each 1D earth model by analyzing the effect of each of the formations on the characteristic being determined and removing formations weakly affecting the characteristic being determined by merging those formations with host formations, and
(ii) determining an optimal set of adjustable model parameters by analyzing the effect of 3D earth model parameters on the characteristic being determined and removing those parameters whose variations weakly affect the characteristic being determined.

In accordance with a further aspect of the present invention, the object may be accomplished in a method for generating a 3D earth model for determining target characteristics of a subsurface area formed by a plurality of formations and comprising drilling positions of real or planned wells, the method comprising the steps of constructing an initial 3D earth model on the basis of measurement data and available properties of the analyzed area and optimizing the constructed initial 3D earth model.

In the further aspect, the step of constructing the initial 3D earth model comprises combining solutions for a set of single unidimensional (1D) earth models with solutions for a set of two-dimensional (2D) earth models. Each of the 1D earth models corresponds to a drilling position of a real or planned well and covers the corresponding aggregate of formations (preferably the entire corresponding aggregate of formations) along the wellbore. The 2D earth models are constructed for individual formations from said aggregates of formations.

In the further aspect, the step of optimizing the constructed initial earth model includes two basic sub-steps. A first sub-step comprises defining an optimal set of formations for every 1D earth model by analyzing the effect of each of the formations on the characteristics being determined and removing the formations weakly affecting the characteristics being determined by merging the formations with host formations. The second sub-step comprises defining an optimal set of calibratable model parameters by analyzing the effect of 3D earth model parameters on characteristics being determined and removing from the set of calibratable parameters the parameters whose variations weakly affect the characteristics being determined.

The following discussion of optional features relates to both of the above aspects.

In preferred embodiments, the characteristic being determined is overpressure. Additionally or alternatively, the formations for which 2D earth models are constructed are laterally hydrodynamically-coupled formations, while the remaining formations are laterally water-impermeable formations.

In preferred embodiments, the step of constructing an initial 3D model applies a basin time scale. The step may comprise specifying coordinates of drilling positions of real or planned wells and model parameters for a set of respective 1D earth models. Solutions of forward problems for the 1D earth models can be found on the basis of the specified coordinates and model parameters. Parameters corresponding to intervals of the laterally hydrodynamically-coupled formations in the 1D models (required to construct 2D earth models in the basin time scale) may be determined from the obtained solutions of the 1D earth models. Solutions of forward problems for 2D earth models on a regular grid may be found by interpolating said parameters on said grid, using relevant grid operators. The initial 3D earth model and relevant 3D forward problem solution may be obtained by combining the obtained forward problem solutions for the 1D and 2D earth models on a common grid in the basin time scale.

In preferred embodiments, the step of optimizing comprises successively removing formations on the basis of a sensitivity analysis by merging the formations with host formations. The successive removal may involve calibrating the 1D earth model by inverting available well data. A sensitivity coefficient vector can then be calculated, the number of components of the vector being equal to the number of formations. The formation which corresponds to a minimum sensitivity coefficient from the calculated sensitivity coefficient vector may be removed by merging the formation with a host formation. The error introduced by the formation removal may be determined, and if the error is less than a predetermined modeling accuracy threshold, the previous steps may be repeated, otherwise optimization of the number of formations may be terminated.

In preferred embodiments, the step of optimizing comprises removing 3D model parameters based on sensitivity analysis. For example, a sensitivity coefficient vector having a number of components equal to the total number of model parameters for all remaining formations may be calculated taking into account the optimal set of formations obtained at the previous optimization step, and an initial threshold value may be specified for the sensitivity coefficients. The model parameters having sensitivity coefficients that are less than the threshold value correspond are then removed by fixing those parameters at their most likely values. The error introduced by the parameter removal is determined, and if the error is less than the specified modeling accuracy threshold, the sensitivity coefficient threshold value is corrected until a permissible modeling error level is satisfied, and the previous and present steps may be repeated, otherwise optimization of the number of updated parameters may be terminated.

Another object of the present invention is to provide an effective method for predicting overpressure before drilling and in real-time while drilling on the basis of the aforementioned preferred embodiment of the method for generating a 3D earth model. This results in optimization and improved safety of the drilling process.

According to a further aspect of the invention, the object may be attained in a method on for predicting overpressure while drilling, comprising the step of constructing, for an area in which drilling is performed, a 3D earth model according to a method of one of the previous aspects in which the characteristic being determined is overpressure. Based on data gathered from offset wells the constructed 3D earth model is pre-calibrated by combined inversion of the gathered well data. Overpressure evolution at a target well position is predicted by solving a relevant forward problem for the pre-calibrated 3D earth model. Real overpressure is determined in the drilling process and a match between the real and predicted overpressures is checked. If a mismatch between the predicted and real overpressures exceeds a predetermined threshold, the earth model is updated by solving a relevant inverse problem and on the basis of the updated model the expected overpressure is calculated by solving a relevant forward problem. The calculated expected overpressure is used as the updated prediction below the present drill bit position.

Preferably, when the overpressure near the present drill bit position approaches a hazardous level, as determined from the updated overpressure prediction, the drilling process is properly adjusted, e.g. to avoid or reduce the hazard.

In preferred embodiments of the method for predicting overpressure while drilling, at least three wells are used to gather the calibration data. The constructed 3D earth model may be pre-calibrated on the basis of the calibration data gathered in said wells, using at least one inversion operator. Overpressure evolution may be predicted by interpolating the set of model parameters obtained at the pre-calibration step for said wells to the target well position and calculating the most likely overpressure versus depth curve. The match between the real and estimated overpressure curves can be continuously checked in the drilling process and mismatch between the estimated and real curves determined. If the mismatch between the calculated and real curves exceeds a predetermined threshold, to minimize the mismatch the earth model may be updated by re-calibration, wherein the mismatch is used as an input to the inversion operator. A relevant updated estimated overpressure curve, obtained by calculations on the basis of the recalibrated earth model, may be used as an updated prediction below the present drill bit position. The overpressure prediction is preferably further updated on the basis of measurement-while-drilling lithologic and stratigraphic data relating to a particular formation by updating the model parameters relevant to the formation on the basis of the data.

Another object of the present invention is to provide a system for predicting overpressure while drilling by implementing a method for predicting overpressure of the previous aspect.

Accordingly, a further aspect of the invention provides a system for predicting overpressure while drilling in accordance with a method for predicting overpressure of the previous aspect. The system comprises at least one data acquisition device for gathering data while drilling. It further comprises a computing device for performing calculations in accordance with the steps of preferred embodiments of the method of the previous aspect, the computing device taking account of data gathered by said at least one data acquisition device. The computing device comprises difference signal generation means for generating a difference signal comprising indication of a mismatch between the estimated and real overpressure curves, and prediction updating means for real-time updating of the prediction of overpressure below the present drill bit position. Said difference signal can form the input to an inversion operator, whereby the prediction updating means can be responsive to said difference signal and can recalibrate the current earth model in real-time, and can update the overpressure evolution prediction by calculations on the basis of the re-calibrated earth model. The system may further include a control signal generation device for generating a signal containing recommendations and instructions for adjusting the drilling process responsive to the results of the real-time updating of the prediction of overpressure below the present drill bit position performed by the computing device.

Indeed, a further aspect of the invention provides a computer system which is operatively configured to perform a method of generating a 3D earth model or predicting overpressure while drilling according to one of the previous aspects. Still further aspects provide (i) a computer program for performing a method of generating a 3D earth model or predicting overpressure while drilling according to one of the previous aspects and (ii) a computer program product carrying such a program.

BRIEF DESCRIPTION OF THE DRAWINGS

The present invention and its features and advantages will be better understood by referring to the following detailed description of its preferred embodiments and the attached drawings in which:

The present invention and its features and advantages will be better understood by referring to the following detailed description of its preferred embodiments and the attached drawings in which:

FIGS. 8a-8C show a procedure of forming an optimal set of calibrated model parameters according to the method of FIG. 7;

DESCRIPTION OF PREFERRED EMBODIMENTS

A method in accordance with the present invention is intended to generate a (preferably invertible) 3D hydrodynamic earth model to be used in analysis and investigation of a geo-fluid system, and in prediction of evolution of target characteristics in a subsurface area of interest in order to optimize the drilling process.

In accordance with the present invention a reference 3D earth model represented by millions of cells with the dozens of model parameters to be specified per each cell can, for specified characteristics, be substituted by a functionally equivalent, but much simplified 3D earth model. The model (combined 3D hydrodynamic earth model) can ensure quick and unique real-time calibration.

In preferred embodiments, a target characteristic is overpressure (over hydrostatic formation pressure), and a main purpose of the combined 3D earth model constructed by the method is to provide overpressure prediction before and during drilling in real-time, the model parameters being calibrated with respect to log data gathered while drilling. It should be appreciated that the approach in accordance with the present invention allows the determination not only of overpressure, but other target characteristics as well, and the method in accordance with the invention can be employed not only for overpressure prediction, but also in the context of a different analysis of a geo-fluid system and prediction of properties thereof.

Figure 1:
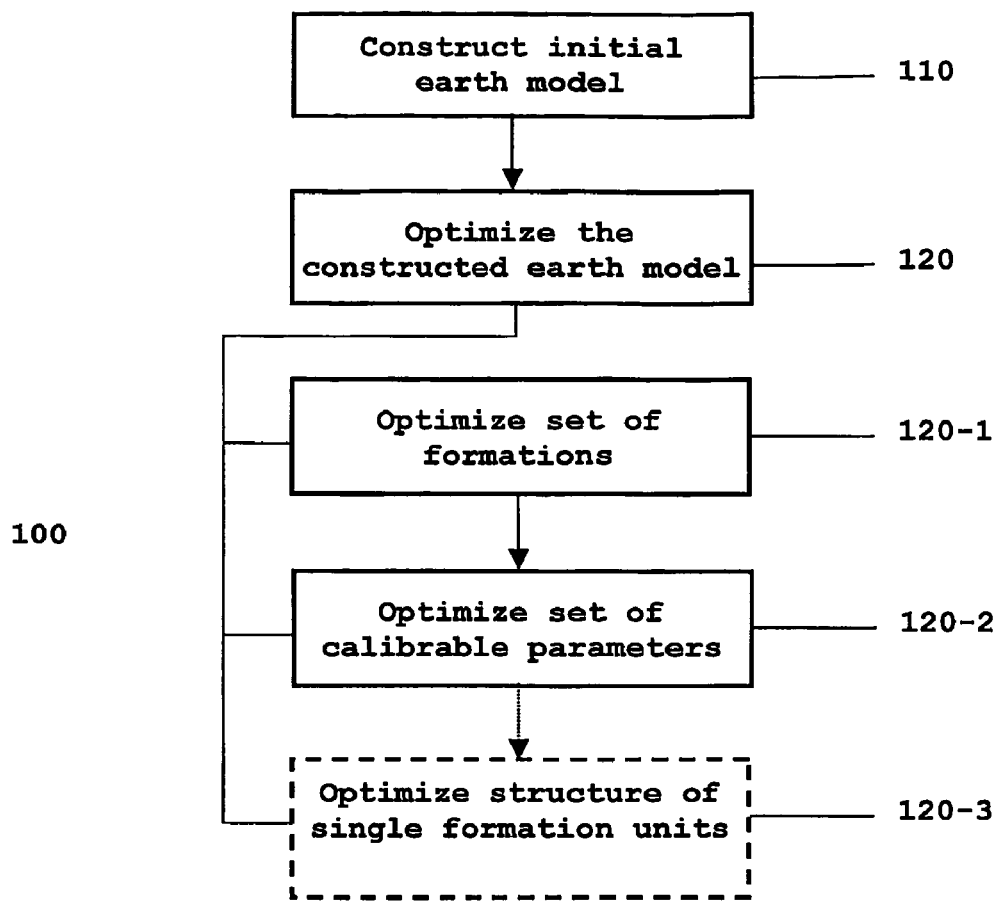
FIG. 1 shows a flow diagram of a method for generating a 3D earth model in accordance with the present invention.

Referring now to FIG. 1, a method 100 for generating a 3D earth model in accordance with the present invention is described. As mentioned above, the method provides substitution of the reference 3D basin earth model by a functionally equivalent combined earth model.

The method 100 in accordance with the present invention includes two main steps: construction of an initial combined 3D earth model with definition of a combined 3D forward modeling operator on a basin model parameter space having generally large dimension (step 110 at FIG. 1), and successive upscaling (reduction in dimension) of the parameter space in order to optimize the earth model constructed in step 110 (step 120 at FIG. 1).

The method in accordance with the present invention essentially combines simplicity and availability of empirical data of the first group of the prior art approaches with the more sophisticated and reliable earth models inherent to the second group of the prior art approaches.

As mentioned above, the method 100 in accordance with the present invention for generating a 3D earth model is intended to determine target characteristics of an area formed by a plurality of formations and comprising drilling positions for real or potential wells (pseudo-wells) includes two main steps. In step 110, an initial combined 3D earth model is constructed on the basis of available measurement data and known properties of the analyzed subsurface area by combining solutions for a set of single 1D earth models with solutions for a set of 2D earth models. As discussed above, the initial combined 3D earth model is constructed on the parameter space of the relevant reference 3D basin earth model, the space having large dimension which makes real-time calibration of the earth model extremely difficult.

Each of the 1D earth models corresponds to a drilling position of a potential or real well and preferably covers the entire relevant aggregate of formations along the wellbore depth (to the bedding cross). It should be noted that "real well" refers here to a drilled well with an associated set of well data which can be used for calibration. "Potential" or "pseudo-well" refers here to a planned well whose section is consistent with all available formation geometry information in the analyzed area.

The 2D earth models are constructed in the analyzed area only for single formations from the above aggregates. The single formations have properties crucial for the earth model construction and respectively for determination of target characteristics, the properties being substantially different from the respective properties of host formations. In particular, in the embodiment described below, the single formations provide lateral hydrodynamic coupling (i.e. in any direction in the bedding plane) meaningful for the geo-fluid system in basin time scale, and act as communicators of respective hydrodynamic potentials that define excess of current fluid pressure level in a section point over the hydrostatic pressure. Respective section intervals should be regularly monitored at real wells, and they are generally associated with regionally consistent collectors which have hydrodynamic properties differing from corresponding properties of host formations.

Relationships between 1D and 2D earth models will be illustrated below in description of a preferred embodiment of the present invention.

In step 120, the initial 3D earth model constructed in step 110 is subjected to optimization, which essentially comprises, as stated above, upscaling (reduction in dimension) of the basin earth model parameter space. The optimization step 120 includes two main sub-steps. In sub-step 120-1 an optimal set of formations in determined for each 1D earth model by analyzing the effect of each formation on the characteristics being determined and removing formations weakly affecting the determined characteristics by merging them with host formations. Therefore, the number of formations included in each 1D earth model can be minimized by eliminating the formations that weakly affect the final result, but are computationally burdensome. An example of this procedure will be described in greater details below with the description of a preferred embodiment of the method in accordance with the present invention.

In sub-step 120-2, an optimal set of calibratable model parameters is determined by analyzing the effect of 3D earth model parameters belonging to said parameter space on the characteristics being determined and removing, from the set of calibratable parameters, those parameters whose variations weakly affect the characteristics being determined. The step is of extreme importance for subsequent calibration of the resulting earth model from the point of view of its use for real-time prediction, which will be discussed in more details below. This sub-step is intended to generate an optimal set of model parameters for subsequent calibration, preferably by successively removing from the set those model parameters whose variations weakly affect the final result, by fixing the parameters at their most likely values. This permits the number of calibratable model parameters to be minimized, thereby further reducing the computational burden and improving stability and uniqueness of data inversion. An example of the procedure will be illustrated below in greater details with the description of a preferred embodiment of the method in accordance with the present invention.

As known, formations often have a rather complex geometry that is defined by different geological structural elements such as flexures, bends, faults, etc. In generating 2D earth models not all such structural elements are equivalent for achieving a predetermined prediction accuracy. Therefore, the 2D model geometry image can be optimally simplified without loss in accuracy of modeling results. In this case the optimization step 120 includes additional sub-step 120-3 (shown by dashed lines in FIG. 1 which meaning that the step is optional), in which the effect of structural elements of said single formations on determined characteristics is analyzed, and structural elements weakly effecting the characteristics are removed, thus in turn reducing computational burden and improving data inversion uniqueness and stability at calibration. An example of this procedure will be described in more details below with the description of a preferred embodiment of the method in accordance with the present invention.

Further a preferred embodiment of a method 100 in accordance with the present invention will be described, wherein the characteristic being determined is overpressure.

Figure 2:
FIG. 2 illustrates a laterally hydrodynamically-coupled formation and laterally water-impermeable formation.

This embodiment relies on the difference in the pressure regimes observable (i) in laterally hydrodynamically-coupled formation units (collector beds) of a geological section, which provide lateral hydrodynamic contact owing to good lateral water-permeability, and (ii) in laterally water-impermeable elements (fluid traps) wherein lateral discharge of excessive formation pressures can be neglected, the laterally hydrodynamically-coupled units being associated with sand lithology or fractured carbonates, and laterally water-impermeable elements being generally associated with clay lithology or dense carbonates (see Magara K., Compaction and fluid migration, 1978, Elsevier Scientific Publishing Company, p. 319). The key factor underlying the above difference is the substantially different rate of excess pressure equalization and direction of relevant fluid flow. In particular, the lateral component of fluid flow during reduction of pore space caused by compaction of host rock is significant for sand intervals, whereas it is negligible for clay intervals (see FIG. 2). Thus, there is no need to resolve the full-scale 3D hydrodynamic basin earth problem for whole geo-fluid system, but rather for laterally hydrodynamically-coupled parts thereof, which efficiently act as pressure communicators during the geo-fluid system burial history.

As noted before, practically-speaking this approach reduces the full scale 3D numerical solution of the forward problem on a regular 3D grid corresponding to a basin model to a combination of solutions obtained for the set of single 1D formation well models with 2D solutions of the same problem obtained for laterally hydrodynamically-coupled formations (aquifers) represented on an irregular grid. It should be noted that relevant numerical solutions were earlier obtained by the authors of the present invention both for the 1D case (see Madatov A. G., Sereda V.-A. I., Doyle E. F., Pore pressure prediction by using inversion before and during drilling, scientific report at symposium "New methods and technologies in petroleum geology, drilling and reservoir engineering", Jun. 19-20, 1997, Krakov, Poland), and for the 2D case (Madatov A. G., Sereda V.-A. I., The decomposition of 2-D overpressure evolution model in basin scale and its application to the fault seal analysis, Review of the Murmansk State University, 2001, Volume 4, No. 1, pages 79-96) based on the implementation of an absolutely stable method of implicit solution of ADI numerical finite-difference problem (see Wang H. F., Anderson M. P., Introduction to Groundwater Modelling. Finite Difference and Finite Element Methods, 1982, Academic Press Inc., 237 pages).

Figure 3:
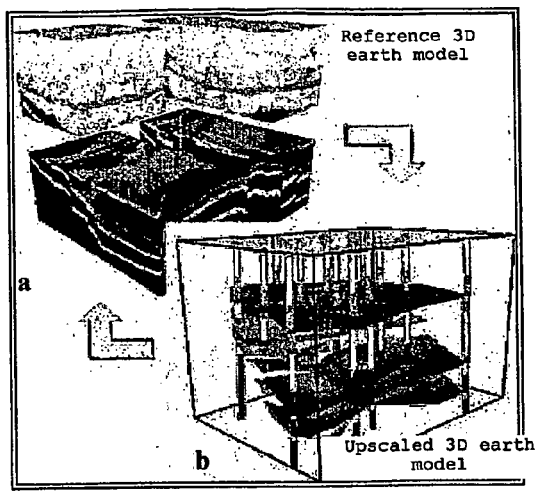
FIG. 3 illustrates a reference 3D earth model and an upscaled 3D earth model in accordance with the invention.

As the result, a virtual cube enclosing an arbitrary 3D basin model of a geo-fluid system, represented by millions of cells with dozens of model parameters to be specified per each cell can be upscaled to the described combination of 1D and 2D solutions which effectively substitute the cube from the overpressure model calibration point of view (see FIG. 3).

This approach allows significant acceleration of the 3D forward modeling run. In particular, the processor time requirements for the regular 3D grid with the number of nodes $N_x=N_y=N_z=1000$ constitutes as little as 0.34% of the corresponding processor time for the classical 3D numerical scheme.

Figure 4:
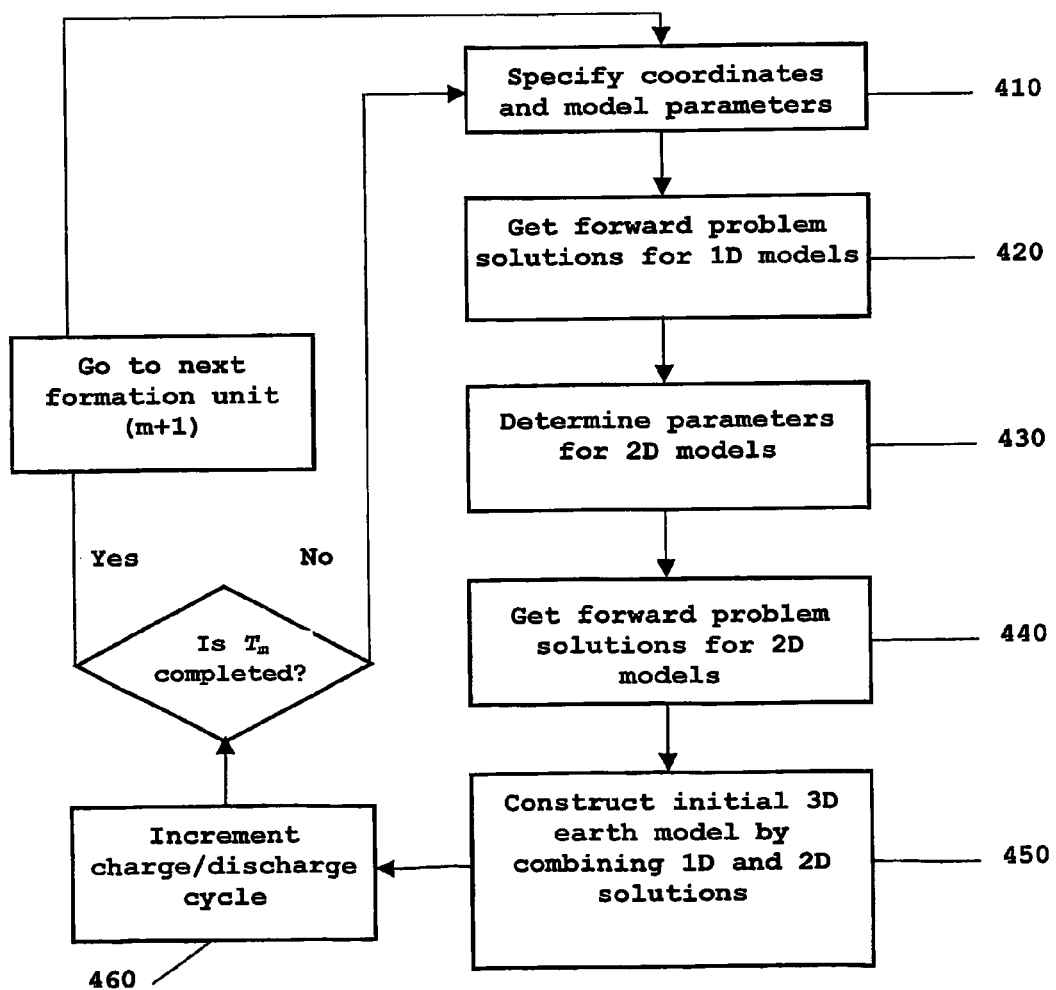
FIG. 4 shows a flow diagram of step 110 of a preferred embodiment of method 100 of FIG. 1.

Referring now to FIG. 4, step 110 of constructing an initial 3D earth model in basin time scale, corresponding to the preferred embodiment of the method 100, will be described in details.

Let the forward solution of the 3D hydrodynamic problem with respect to threshold overpressure be derived inside a target 3D subsurface area. In accordance with the aforesaid, the resulting 3D model includes $M_W$ 1D earth models (across the entire relevant combination of formations) and $M_L$ 2D hydrodynamic earth models (for laterally hydrodynamically-coupled formations). Note that at least one such lateral channel is to be represented in each of the $M_W$ 1D models at a corresponding depth interval. Otherwise, the model will be divided into a series of models that are not hydrodynamically coupled, i.e. that are 1D in the limit. It is also assumed that all stratigraphic, lithologic and tectonic parameters to be specified are available for all the hydrodynamic models. Let finally the single charge-discharge cycle of the analyzed geo-fluid system development be determined on a stratigraphic scale as a time interval within which the deposit formation tempo has been unchanged for the formation, and the unit time step of the geological time scale in the finite difference scheme be defined in agreement with acceptable stability level. Any single "charge-discharge" cycle should be described by an integer number of single geological time steps. Then the combined solution for overpressure evolution in the analyzed 3D area can be derived through the following repeating set of steps (see FIG. 4).

In step 410, coordinates of prospective wells and model parameters are specified for the set of relevant 1D earth models. The step also comprises generating grids for performing calculations and preferably forming geometry images of laterally hydrodynamically-coupled formations, corresponding to the present instant. Model parameters can be specified by direct input of their available values or by calculations from reference models. By way of example, in the described application of the preferred embodiment of the overpressure prediction method 100, model parameters are specified by interpolation.

In step 420, a forward problem solution $P_{x,y,z}^{(1/2)}$ is found on the generated spatial grids $\omega_{x,y}^T$ individually for each of $M_W$ 1D earth models on the basis of the coordinates and parameters specified in step 410, at charge-discharge half-cycle. The $P_{x,y,z}^{(1/2)}$ is essentially an intermediate pressure solution, with x and y axes in the earth surface plane, and z axis directed to depth.

In step 430, parameters corresponding to intervals of laterally hydrodynamically-coupled formations in 1D models and required for constructing 2D earth models in the basin time scale are determined from $M_W$ forward solutions $P_{x,y,z}^{(1/2)}$ obtained in step 420 for 1D earth models. In this step, the current values of parameters corresponding to intervals of laterally hydrodynamically-coupled formations are interpolated for each 1D model on regular 2D grids $\omega_z^T$ to obtain a set of parameters which is needed to get 2D hydrodynamic problem forward solution individually for each of $M_L$ laterally hydrodynamically-coupled formations. The instant laterally hydrodynamically-coupled formation geometry image formed in step 410, if available, is preferably used in step 430 to obtain parameters required for 2D models.

From the parameters determined in step 430, the forward problem solution $P_{x,y,z}^{(1)}$ is found on regular grids $\{\omega_z^R\}$ in step 440 using relevant grid parameters individually for each of $M_L$ 2D earth models at the second half of the charge-discharge cycle.

In step 450, an initial 3D earth model is generated and the corresponding 3D forward problem solution is derived by combining the obtained solutions for $M_W$ 1D and $M_L$ 2D earth models on a common grid in the basin time scale. In this step, the solutions $P_{x,y,z}^{(1)}$ obtained in step 440 are re-distributed back to common irregular grid $\omega_{x,y}^T \cup \omega_z^R$ according to x and y coordinates of the well drilling positions, corresponding to 1D models associated with $M_L$ laterally hydrodynamically-coupled formations.

In step 460, a single increment is made in the charge-discharge cycle. If the time interval $T_m$ related with the m-th formation unit depositing is not finished, the process proceeds to step 410, otherwise a new (m+1)-th charge-discharge loop is started from step 410 for a new formation unit.

Further, each sub-step of the optimization step 120 of a preferred embodiment of the method 100 will be described in detail.

Figure 5:
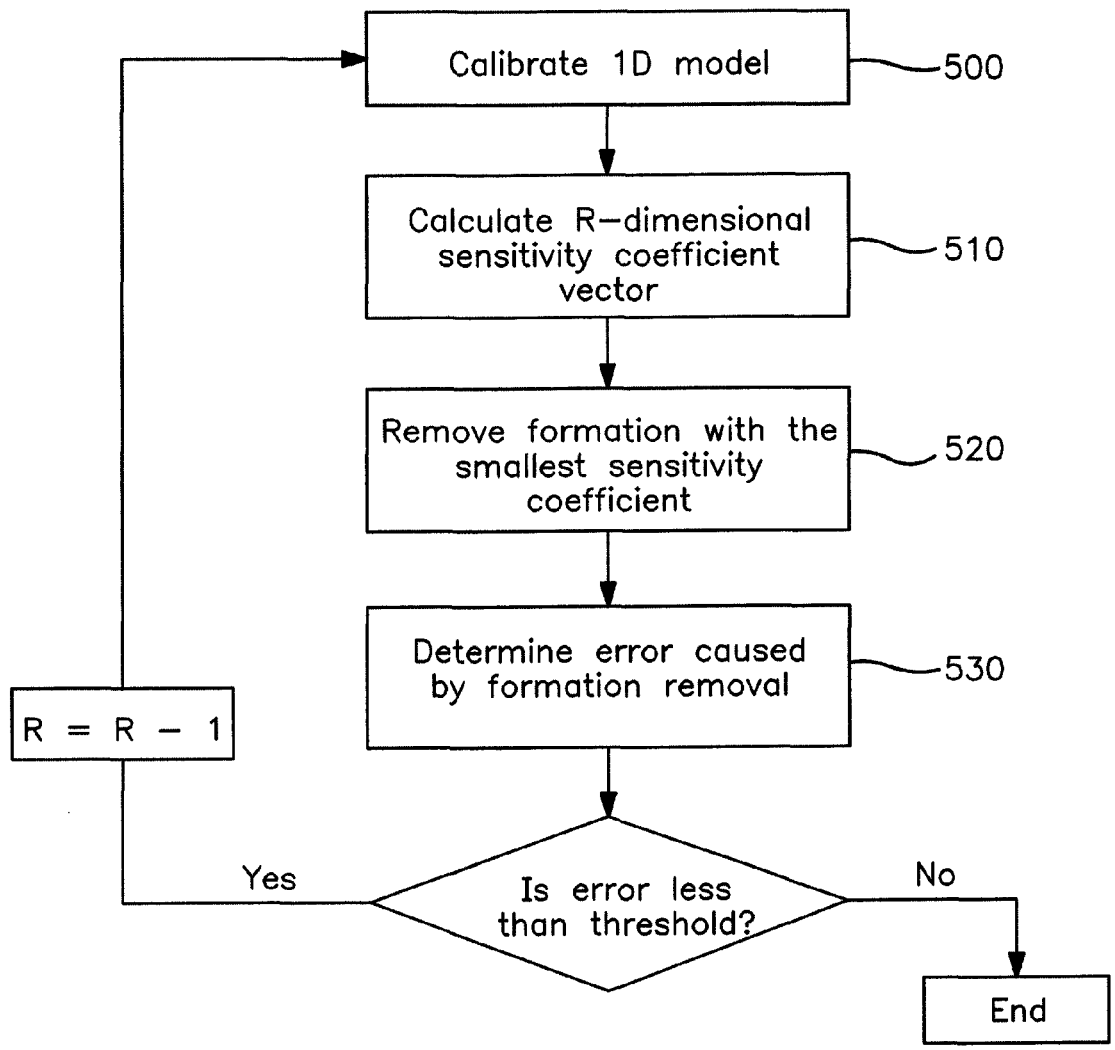
FIG. 5 shows a flow diagram of sub-step 120-1 of step 120 of the preferred embodiment of method 100 of FIG. 1.

In the preferred embodiment of the method in accordance with the present invention, in sub-step 120-1 of the optimization step 120 the formations are successively removed on the basis of a sensitivity analysis by merging them with host formations. A detailed description of procedures of sub-step 120-1 carried out for each of $M_W$ 1D earth models will be presented below with reference to FIG. 5.

In step 500, the 1D earth model is calibrated by inverting available well data. The well data can be a priori known or obtained by any suitable conventional method or means. In step 510, a sensitivity coefficient vector is calculated for the 1D earth model being analyzed, the number of components of the vector being equal to the number R of formations. Each component of the vector describes the effect of a respective formation on the target overpressure distribution.

In step 520, the formation, to which the minimum sensitivity coefficient corresponds, is removed from the components of the sensitivity coefficient vector calculated in step 510 by merging the formation with host formations.

In step 530, an error introduced in the solution by the formation removal in step 520 is determined, and if the error is less than a predetermined modeling accuracy threshold, R is reduced by one (i.e. R=R−1) and steps 500-530 are repeated, otherwise the formation removal procedure is terminated. This results in a model optimized in terms of the number of described formation units.

Figure 6A:
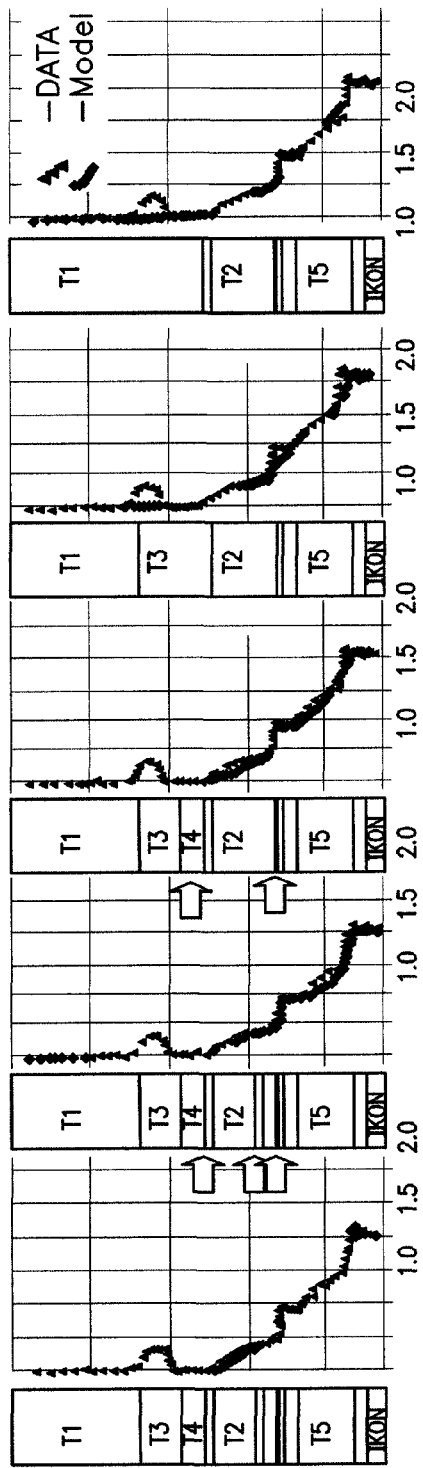
FIGS. 6a and 6b show a procedure of successive removal of formations according to the method of FIG. 5.
Figure 6B:
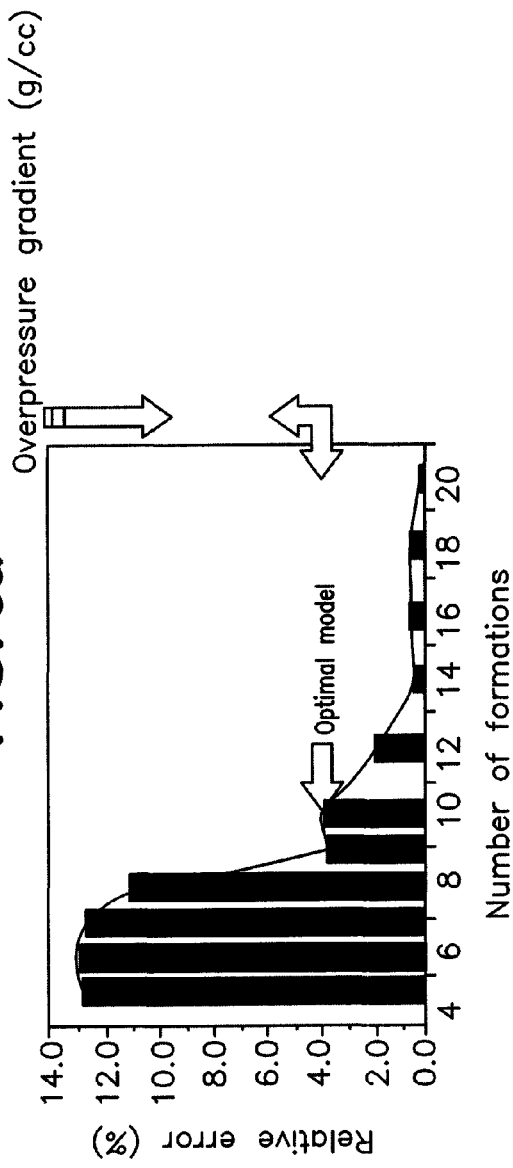

The process of successive removal of formations is further illustrated in FIGS. 6a and 6b. In particular, FIG. 6a shows successive removal of formations where the formations being removed are denoted by white arrows. FIG. 6b shows the corresponding dependence of the relative error caused by the formation removal on the number of formations. The arrow shows a permissible error value (threshold) defining the optimal set of formations.

Figure 7:
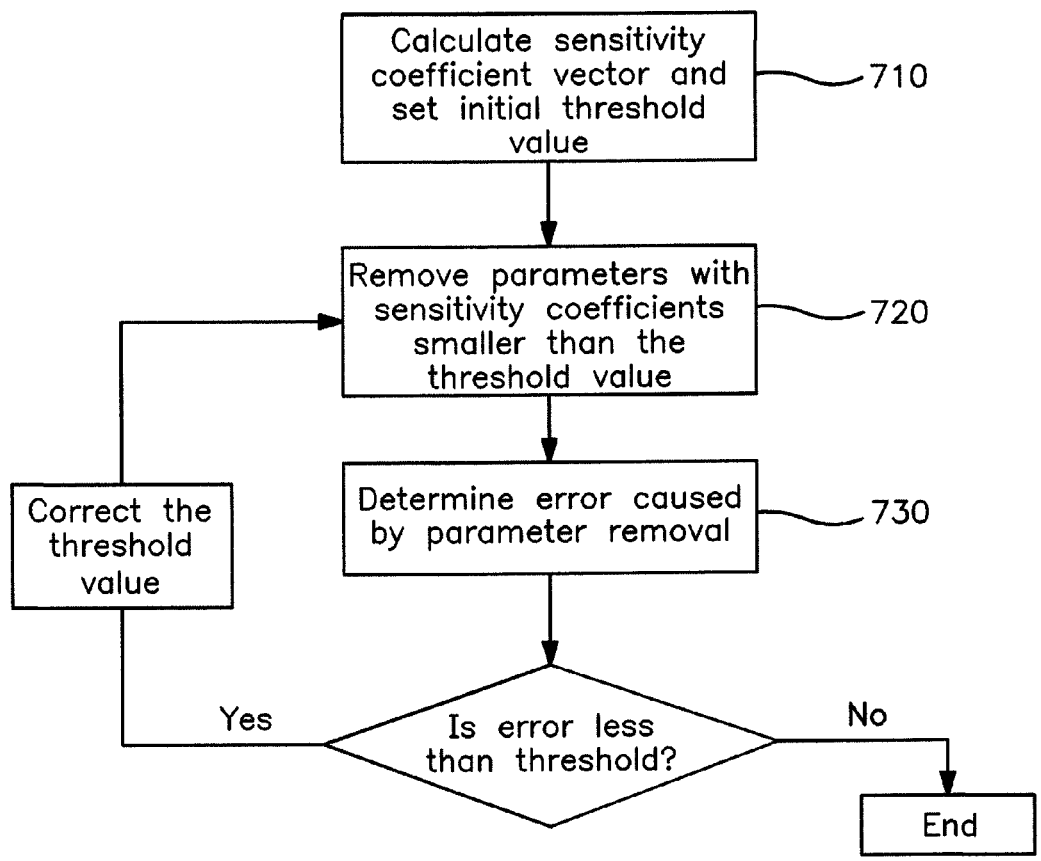
FIG. 7 shows a flow diagram of sub-step 120-2 of step 120 of the preferred embodiment of method 100 of FIG. 1.

In a preferred embodiment of the method 100 in accordance with the present invention, sub-step 120-2 of the optimization step 120 comprises removing model parameters from the set of calibratable parameters responsive to sensitivity analysis. Sub-step 120-2 will be described below with reference to FIG. 7, which sub-step is performed for each of $M_W$ 1D earth models for which pre-optimization of the number of formations has been carried out in accordance with steps 500-530 at FIG. 5.

In step 710, a sensitivity coefficient vector is calculated, the number of components of which is equal to the total number of model parameters for all remaining formations, and an initial threshold value for the sensitivity coefficients is specified. For an N-dimensional vector x of model parameters, belonging to N-dimensional vector space X, corresponding to the analyzed 1D earth model, the sensitivity coefficient vector components are defined in accordance with the following relationship:

$$S_k^{(1)}(x, \delta_k x) = \frac{\|M^{(1)}(x + \delta_k x) - M^{(1)}(x)\|}{\|M^{(1)}(x)\|}, k = 1, 2, \ldots, N,$$

where $M^{(1)}(x)$ is the 1D forward modeling operator constructed on N-dimensional vector space of X model parameters (see Madatov A. G., Sereda V.-A. I., The forward and inverse problems of the fluid dynamics in basin modeling applied to the pore pressure prediction within the sedimentary basins. Part 1. Theory aspects, Proceeding of the Murmansk State Technical University, 2000, Volume 3, No. 1, pages 89-114); $\delta_k x$ is the variation of the vector x of model parameters, at which only its k-th component changes, and the remaining components remain unchanged; $\|\cdot\|$ is the norm.

The sensitivity coefficient threshold value, which is also referred to here as the "cutoff level", defines the level below which model parameter variations are considered to be weakly affecting the final result in terms of modeling accuracy of the geo-fluid system target (predicted) property (particularly overpressure). In step 710, an initial value of the threshold value is specified, and in the following steps the value is corrected until a permissible modeling error level is satisfied.

In step 720, model parameters, to which sensitivity coefficients less than the threshold value correspond, are removed from the set of calibratable parameters. These parameters are fixed at the most likely values, this implying their invariance.

In step 730, an error introduced in the solution by removal of the parameters in step 720 is determined, and if the error is less than a predetermined modeling accuracy threshold, the sensitivity coefficient threshold value is corrected until a permissible modeling error level is satisfied, and steps 720-730 are repeated, otherwise the optimization of the set of calibratable parameters is terminated. The result is a model optimized in terms of the number of model parameters to be subsequently calibrated.

The described process of removing model parameters is further illustrated in FIGS. 8a-8c. In particular, FIG. 8a shows components of a normalized sensitivity coefficient vector for each of the individual formation and the optimal cutoff level. FIG. 8b shows the respective relationship between the relative error caused by said removal of the model parameters and the number of calibratable model parameters, the optimal set of calibratable model parameters being defined by a permissible relative error level (threshold).

As mentioned earlier, structural elements such as faults are preferably taken into account for laterally hydrodynamically-coupled formations. Sub-step 120-3 of the optimization step 120 of the preferred embodiment of method 100 will be further described with reference to FIG. 9, wherein faults are taken into account in laterally hydrodynamically-coupled formations, for which 2D earth models are constructed.

In this optimization sub-step, sensitivity analysis is carried out for each 2D earth model to define the effect of fault segments on calculated overpressure, and the segments weakly affecting the final result (i.e. the segments the absence of which the target solution is weakly sensitive) are excluded.

Figure 9:
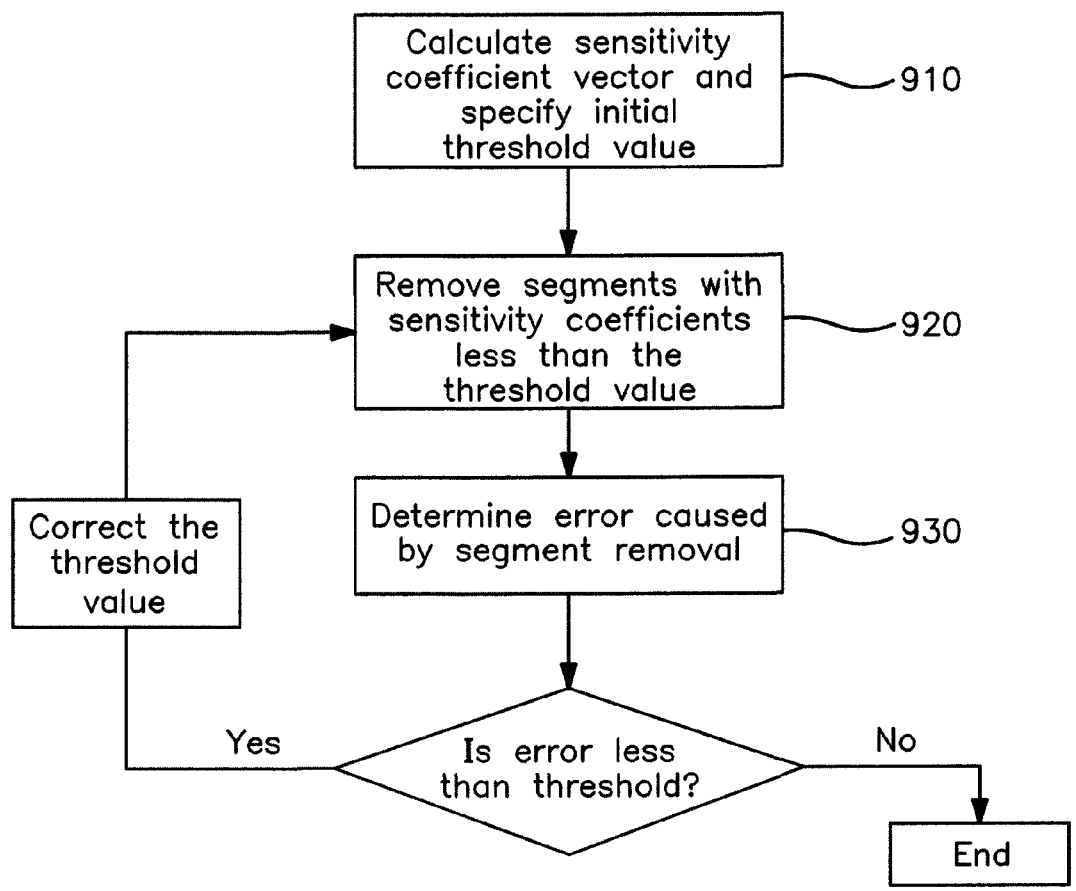
FIG. 9 shows a flow diagram of sub-step 120-3 of step 120 of the preferred embodiment of method 100 of FIG. 1.

In step 910 of FIG. 9, the components $S^{(2)}_k$ of the sensitivity coefficient vector are calculated for a 2D earth model at the level of the associated laterally hydrodynamically-coupled formation, the number of components of the vector being equal to the number of fault segments within the analyzed calibration area for the laterally hydrodynamically-coupled formation, in accordance with the following relationship:

$$S_k^{(2)}(r, \delta_k r) = \frac{\|M^{(2)}(r + \delta_k r) - M^{(2)}(r)\|}{\|M^{(2)}(r)\|}, k = 1, 2, \ldots, L$$

where L is the number of segments within the analyzed calibration area for the laterally hydrodynamically-coupled formation, r is the L dimensional vector defining the aggregate of the fault segments, $M^{(2)}(r)$ is the two-dimensional forward modeling operator; $\delta_k r$ is the variation of vector r, at which only its k-th component changes, while the remaining components stay unchanged; $\|\cdot\|$ is the norm.

In step 910, an initial threshold value for the sensitivity coefficients is also specified. Fault segments which correspond to sensitivity coefficients below the threshold value are considered to be weakly affecting the final result.

In step 920, the segments which correspond to sensitivity coefficients less than the threshold value specified in step 910 are excluded. As noted earlier, in the construction of the 2D models for modeling a formation surface, irregular grids are used (triangulation approach), wherein nodes of the irregular grid correspond to the fault segments. In step 920 the fault segments are preferably excluded by successive removal of respective irregular grid nodes.

In step 930, an error introduced in the solution by segment exclusion in step 920 is determined, and if the error is less than a predetermined modeling accuracy threshold, the sensitivity coefficient threshold value is corrected until the permissible modeling error level is satisfied, and steps 920-930 are repeated, otherwise optimization of the fault segment number for the analyzed earth model is terminated. The result is a model optimized in terms of the number of fault segments of the laterally hydrodynamically-coupled formations.

Figure 10C:
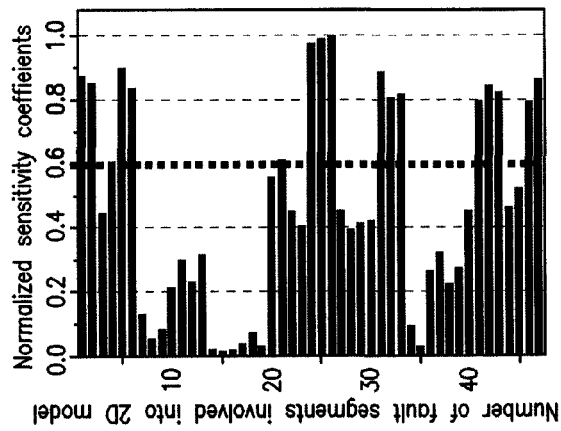
FIGS. 10a-10d show a procedure of optimization of fault structure according to the method of FIG. 9.
Figure 10B:
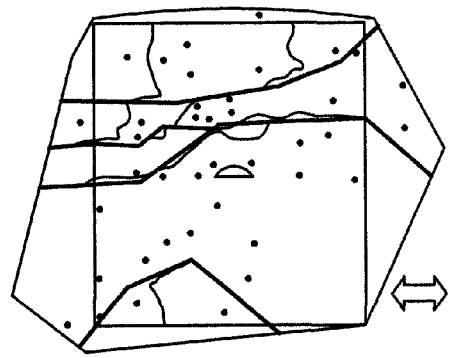
Figure 10A:
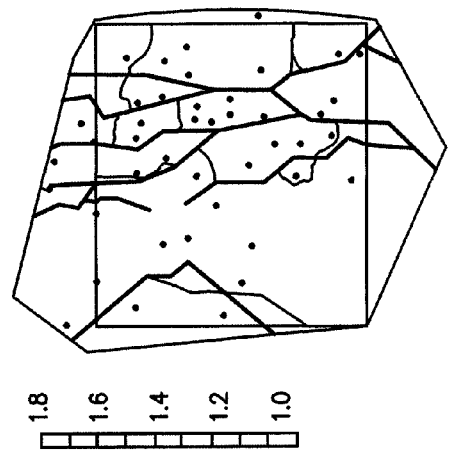
Figure 10D:
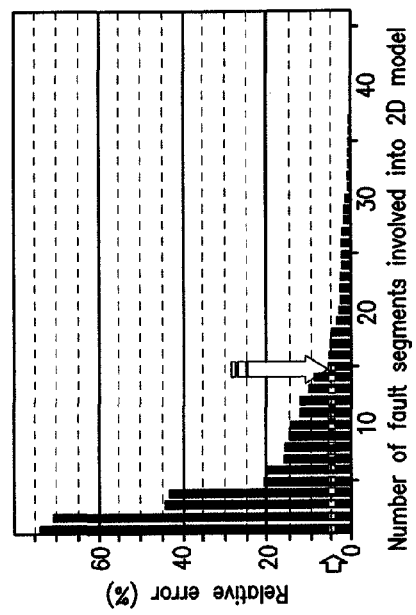

The process of fault segment exclusion is further illustrated in FIGS. 10a-10d. In particular, FIG. 10a and FIG. 10b show calculated pressure gradient maps (scaled to the specific weight of balancing liquid column) based on an initial and optimized fault structure, respectively, in the spatial area of a laterally hydrodynamically-coupled formation. FIG. 10c shows the components of the normalized sensitivity coefficient vector and the cutoff level. FIG. 10d shows the relative error between the reference (FIG. 10a) and optimized (FIG. 10b) models versus the number of fault segments, and the permissible error level (threshold) defining the optimal fault structure.

Figure 11:
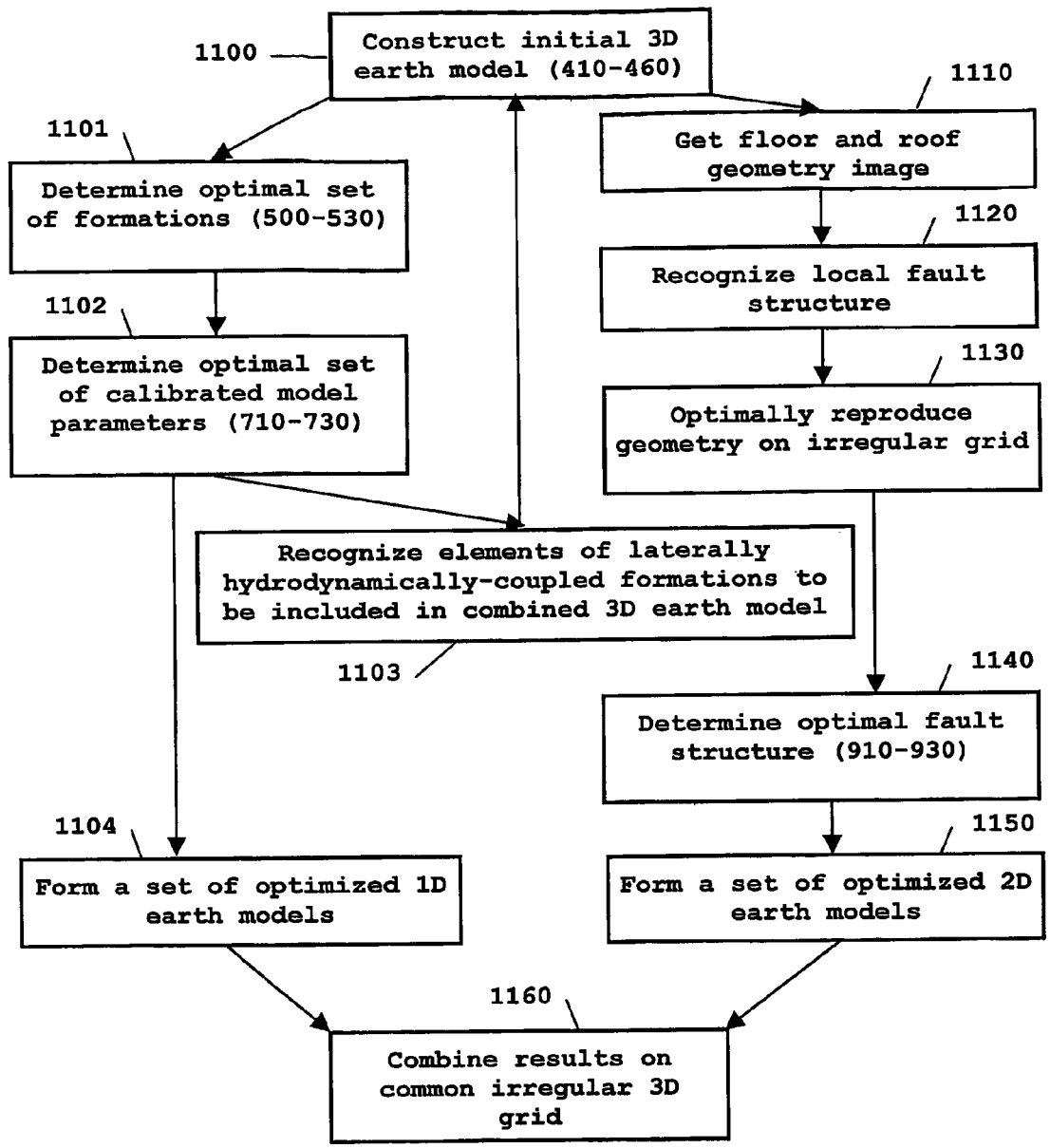
FIG. 11 shows a flow diagram of step 120 of the preferred embodiment of method 100 of FIG. 1.

Referring now to FIG. 11 for a preferred embodiment of the method 100 in accordance with the present invention, wherein faults are taken into account in generating the 2D earth model, a general flow diagram of procedures in the optimization step 120 will be described with account of preferred embodiments of sub-steps 120-1, 120-2, 120-3, respectively, described above with reference to FIGS. 5-10. As seen in FIG. 11, the optimization process is performed for the initial earth model (block 1100) constructed in accordance with steps 410-460 of FIG. 4, and includes two separate branches which will be separately described below.

The first branch characterizes the model optimization in terms of the number of formations and model parameters. In step 1101, an optimal set of individual formations is determined by carrying out steps 500-530 of FIG. 5 for each 1D model on the basis of the sensitivity analysis. In step 1102, an optimal set of model parameters to be further calibrated is determined for each 1D model based on the sensitivity analysis, taking into account the results of step 1102, by carrying out steps 710-730 of FIG. 7, while the remaining model parameters are fixed at their most likely values.

In step 1103, the formations corresponding to laterally hydrodynamically-coupled formations to be included into the combined 3D model are identified among the residual formations by a final sensitivity analysis. Said sensitivity analysis relies on the final results of the sensitivity analysis of step 1102. In the resulting list of model parameters, effective lateral conduction, to which the target solution is highly sensitive, corresponds to formations relating to laterally hydrodynamically-coupled formations (see FIG. 8c).

In step 1104, the set of optimized 1D earth models is obtained.

The second branch defines model optimization in terms of the structure of each of the laterally hydrodynamically-coupled formations, for which 2D hydrodynamic models are constructed. In step 1110, geometrical images of upper and lower surfaces (roof and floor) of a laterally hydrodynamically-coupled formation are obtained by any conventional method. The obtained roof and floor images are further exported on a regular 2D grid.

In step 1120, a fault structure is identified for the analyzed formation, e.g. by the known gradient analysis of the map grid structure.

In step 1130, optimal reproduction of the analyzed formation geometry on irregular grid is obtained, e.g. using the algorithm for optimal correction of triangulation interpolation.

In step 1140, an optimal structure of fault segments for the analyzed formation is determined by carrying out the sensitivity analysis of steps 910-930 of FIG. 9, and the grid is properly optimized.

In step 1150, the set of optimized 2D earth models for the laterally hydrodynamically-coupled formations is obtained.

The results of steps 1104 and 1150 are combined in step 1160 on a common irregular 3D grid to obtain the resulting combined 3D earth model suitable for subsequent calibration.

In light of the aforesaid, a main application of the preferred embodiment of a method for constructing 3D earth model, like the described one, is to predict overpressure before and during drilling in real-time.

Figure 12:
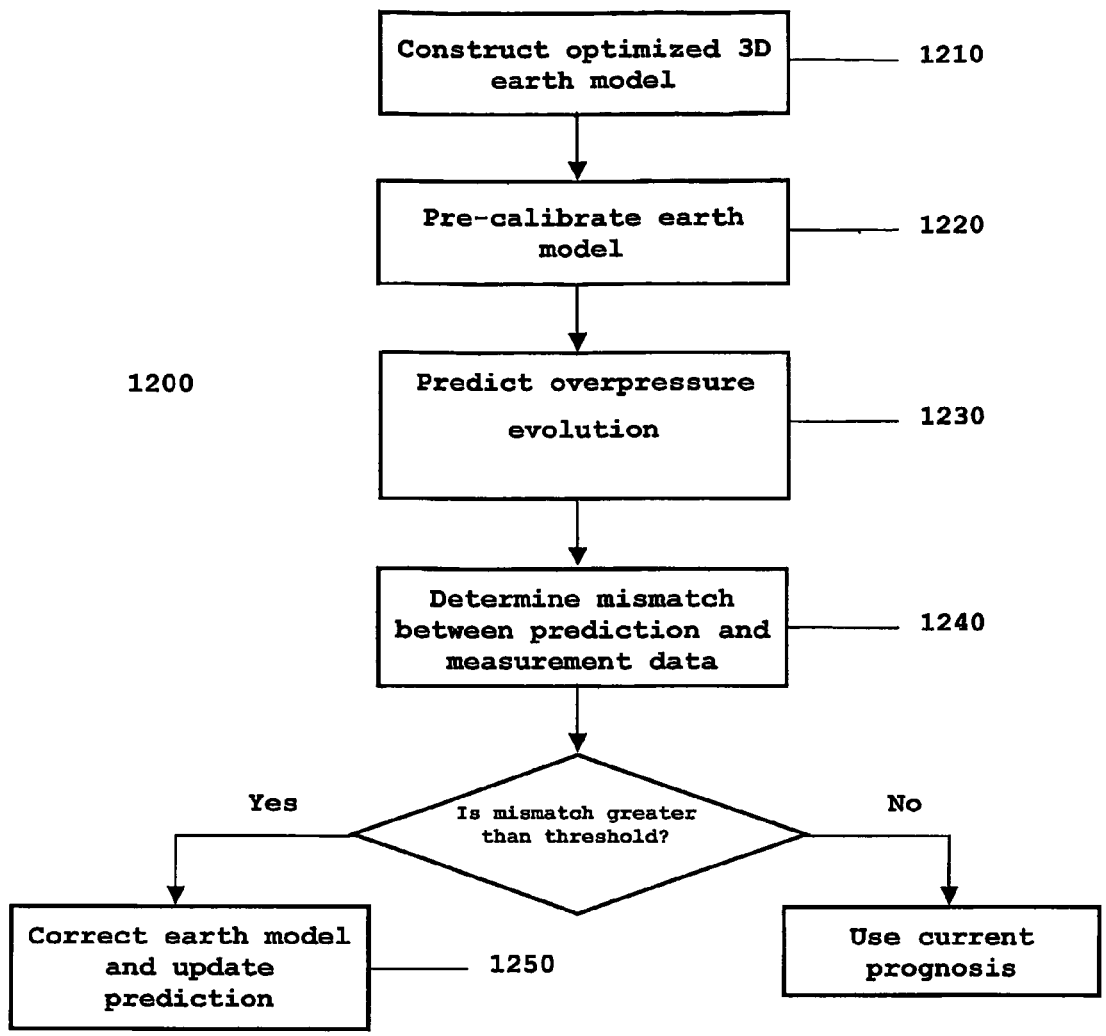
FIG. 12 shows a flow diagram of a method of predicting overpressure while drilling in accordance with the invention.

Referring now to FIG. 12, a method 1200 will be described for predicting overpressure while drilling, based on the preferred embodiment of the method for constructing 3D earth model described above with reference to FIGS. 1 to 11.

In step 1210, an optimized combined 3D earth model is constructed for an area in which drilling is carried out, in accordance with the described preferred embodiment of the method 100 for generating 3D earth model in accordance with the present invention. As stated above, the so-constructed earth model allows real-time calibration, thus enabling the prediction to be, in fact, continuously updated which significantly improves prediction accuracy.

In step 1220, the constructed 3D earth model is pre-calibrated (before drilling) on the basis of data gathered from adjacent real wells by combined inversion of all the gathered well data. Test and log data forming the basis for the calibration is gathered in wells by any suitable conventional means and methods. More detailed disclosure of the model pre-calibration will be presented below with the description of a preferred embodiment of the method for while-drilling prediction of overpressure in accordance with the present invention.

In step 1230, overpressure evolution is predicted at a target well position by solving the relevant forward problem for the 3D earth model, with respect to which the pre-calibration has been performed in step 1220.

As noted before, one of the main advantages of the approach elaborated in the present invention is the possibility of employing the constructed 3D earth model for while-drilling prediction, the model being updateable in real-time in response to measurement data acquired while drilling. In step 1240, a match between the actual overpressure obtained while drilling and the overpressure predicted by model-based prediction is checked. The actual overpressure can be obtained while drilling e.g. by measurements and/or interpretation of log data. The step is mainly aimed at determining whether updating of the overpressure prediction is required or not for its adjustment below the present drill bit position. If the mismatch between the predicted and real overpressures exceeds a predetermined threshold, the earth model is updated in step 1250 by solving the relevant inverse problem, and the expected overpressure is calculated on the basis of the updated model by using the relevant forward problem solution to update the prediction below the present drill bit position. The earth model updating will be further described in greater detail with the description of a preferred embodiment of the method for predicting overpressure while drilling.

One of the main goals of the overpressure evolution prediction is to minimize the risks while drilling, thus the drilling process should preferably be adjusted when the overpressure evolution below the present drill bit position (as defined from the updated overpressure) approaches a hazardous level prediction. The adjustment can comprise any conventional amendment to the drilling technique aimed at minimizing the probability of the forecasted hazardous situation occurring.

A preferred embodiment of a method for forecasting overpressure while drilling will be described below in details. First, referring to FIG. 13, step 1220 will be described for preliminary (pre-drill) calibration of the combined and optimized 3D earth model, constructed by the method of the present invention.

The pre-calibration step essentially involves determining all model parameters required to obtain the solution of the forward 3D hydrodynamic problem using the solution of the respective inverse problem. This is, in turn, reduced to gathering real formation pressure data and data related to formation pressure, and inverting the gathered data with respect to the model parameter space optimized in the earth model generation step (step 1210) (see Menke W., Geophysical data analysis: Discrete Inverse Theory, 1984, Academic press, New York, 312 pages). The data can be gathered by any suitable conventional means and methods.

Figure 13:
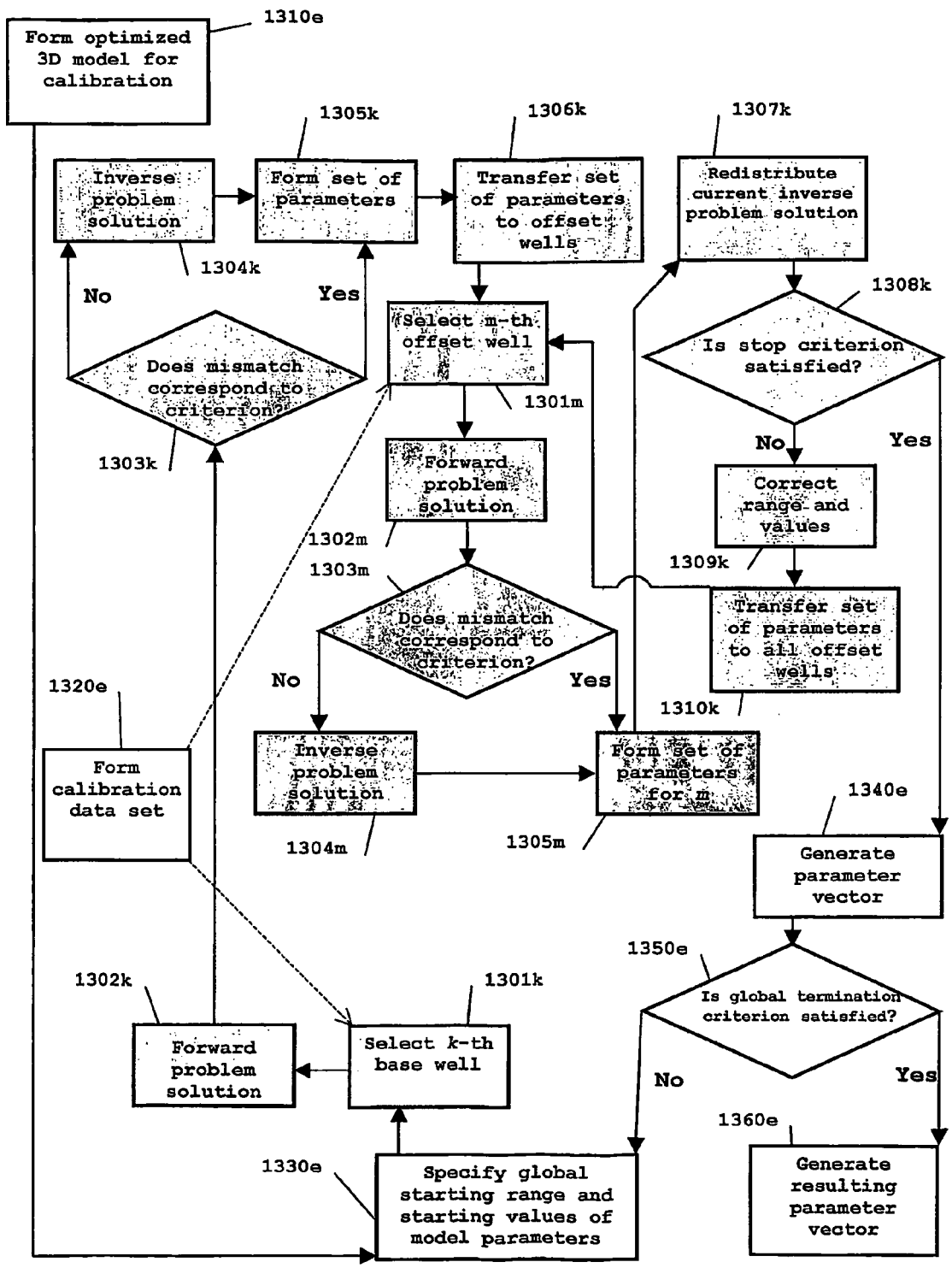
FIG. 13 shows a flow diagram of step 1220 of the preferred embodiment of method 1200 according to FIG. 12.

The general flow diagram of the pre-calibration operations of FIG. 13 includes external operations (steps 1310e-1360e) intended mainly for data input/output and calculation operations (shown at FIG. 13 by shaded blocks) intended for the inversion of data sets related to pressure and porosity and gathered in a plurality of real wells. The data inversion is supposed to be performed into the earth model parameters optimized at the step of generating thereof by the aforementioned method.

In step 1310e, an optimized 3D earth model suitable for calibration is obtained from step 1210. In step 1320e, a calibration data set to be used in an internal repeat loop (m-loop) is obtained (see FIG. 13). In this step, direct and indirect overpressure and porosity estimates obtained from real wells in the analyzed area (calibration wells) are used as real input. In step 1320e, any suitable conventional means and methods for processing and interpreting the log data can be used. In step 1330e, a global starting range and starting values of the model parameters are specified by deriving the desired information from the output of step 1310e, and then an external repeat loop (k-loop) over the calibration wells used for pre-calibration (to step 1301k) is entered.

In step 1301k, the k-th base well involved in the external loop is chosen, and in step 1302k the forward problem solution is calculated from the current 3D earth model. In step 1303k, it is determined whether the mismatch between the real and calculated data is consistent with a predetermined criterion. The step comprises e.g. calculating and verifying the mean-square vector norm. If the mismatch does not satisfy the criterion in step 1303k, the inverse problem solution is found in step 1304k in the form of a model parameter vector which leads to an acceptable mismatch between the real and model data. This procedure, referred to as the inversion operation and performed by a respective inversion operator applied to the data, will be described in more detail below, then the process proceeds to step 1305k. If in step 1303k it is determined that the criterion is satisfied, the process proceeds directly to step 1305k, in which a set of model parameters for the k-th base well is obtained. In this step a model parameter vector is formed in compliance with 1D inverse problem solutions for specified calibration well positions. Then, in step 1306k, the model parameter set obtained as the 1D inverse problem solution, is transferred to all adjacent calibration wells in accordance with their positions. From step 1306k the process proceeds to the internal loop (m-loop) over calibration wells used for calibrating each individual 1D model (to step 1301m).

In step 1301m, the m-th offset well involved in the internal loop is chosen and the forward problem solution is calculated from the current 3D earth model in step 1302m. In step 1303m, similarly to step 1303k, it is determined whether the mismatch between real data and calculation results satisfies a predetermined criterion. If the criterion is not satisfied in step 1303m, the solution of the inverse problem corresponding to inversion of single calibration well data taking account of the mentioned mismatch is found in step 1304m, similarly to step 1304k, using the inversion operator, whereupon the process proceeds to step 1305m. If the criterion is satisfied in step 1303m, the process proceeds directly to step 1305m, in which, similarly to step 1305k, a set of model parameters for the m-th offset calibration well is obtained, then the process exits the internal loop to return back to step 1307k of the external loop.

Then, in step 1307k, the current solution of the inverse problem corresponding to inversion of data for a plurality of calibration wells, is redistributed in compliance with obtained solutions of inverse problems, each of which corresponds to inversion of separate calibration well data, and with positions of offset wells. Thereafter the process proceeds to step 1308k to determine whether the termination criterion is satisfied by calculating relative functional norms and checking their magnitudes with respect to the selection quality criteria. If the criterion is not met in step 1308k, the process proceeds to step 1309k, in which the model parameter range and values are corrected. In this step, the solution of the inverse problem corresponding to inversion of data for a plurality of calibration wells is re-grouped in order to obtain a more acceptable starting point for the next stage of the cyclic data inversion process. From step 1309k the process proceeds to step 1310k in which, similarly to step 1306k, the set of model parameters is transferred to all adjacent calibration wells, and then to step 1301m of the internal loop.

If in step 1308k it is determined that the criteria are satisfied, the process proceeds to step 1340e of the external loop, in which a particular model parameter vector is formed in agreement with the inverse problem solutions (steps 1304k, 1304m) and positions of calibration wells. Then the process proceeds to step 1350e to determine, similarly to step 1308k, whether the global termination criterion of the described procedure (earth model quality by the inverse problem solution uniqueness criterion) is satisfied. If the criterion is not satisfied in step 1350*e*, the process proceeds to step 1330*e* in which the process repeatedly enters the external loop (step 1301*e*). If the criterion is satisfied in step 1350*e*, the process proceeds to final step 1360*e*, in which the resulting model parameter vector is formed and thereby a pre-calibrated earth model is obtained.

The core data inversion calculation process carried out in steps 1304*k* and 1304*m* consists in implementing standard optimization techniques, e.g. conjugate gradient and Newton-Gauss methods (Menke W., Geophysical data analysis: Distinct Inverse Theory, 1984, Academic press, New York, 312 pages), for minimization of real versus theoretical data misfit (Madatov A. G., Sereda V.-A. I., Doyle E. F., Pore pressure prediction by using inversion before and during drilling, Scientific report at symposium "New methods and technologies in petroleum geology, drilling and reservoir engineering", Jun. 19-20, 1997, Krakov, Poland). It allows a local 1D inverse problem solution to be obtained at every calibration well in terms of the 1D distribution of the model parameter vector (see Madatov A. G., Sereda V.-A. I., The forward and inverse problems of the fluid dynamics in basin modeling applied to the pore pressure prediction within the sedimentary basins. Part 1. Theory aspects, Proceeding of the Murmansk State Technical University, 2000, Volume 3, No. 1, pages 89-114). Extension of single well 1D inverse problem solutions to the multi-well case allows the regularization of results and selection of an area-unique solution from the set of available single-well solutions based on maximization of earth model quality criteria (steps 1350*e*, 1308*k*), i.e. the solution in fact of a 3D inverse problem.

Due to the optimization performed in the step of constructing a combined 3D earth model, and the relative computational simplicity of the 3D forward modeling operator (steps 1302*k*, 1302*m*), the data pre-calibration (inversion) in accordance with this algorithm appears to be a practically workable process which provides a distribution of model parameters together with their variation range for the whole calibration area. There is no size limitation to the analyzed calibration area and the number of the offset wells used for data inversion, except that all of them should belong to a single geo-fluid system. The general requirement is that at least three wells should preferably be made available to use interpolation of model parameters instead of extrapolation on a target well position for the next stages. Practically, the more wells that can be involved as calibration data sources, the more accurate the calibration will be.

The processor time requirement for pre-drill calibration of a single 3D earth model is quite realistic. In particular, obtaining the unique solution from a twelve calibration well data set inversion from roughly predefined model parameter default values should not take more than 1-2 hours, depending on the optimal feature space of the earth model and its quality established by the inversion termination criteria.

The model parameters obtained in pre-calibration step 1220 jointly with the possible variation ranges around the most likely values are used next in the overpressure prediction step 1230. In a preferred embodiment, this step comprises estimation of overpressure scenarios for the target well position based on the relevant calibrated forward 3D earth model solutions. The input for said model is obtained by interpolation of the calibrated model parameter values on the target well position.

Figure 14:
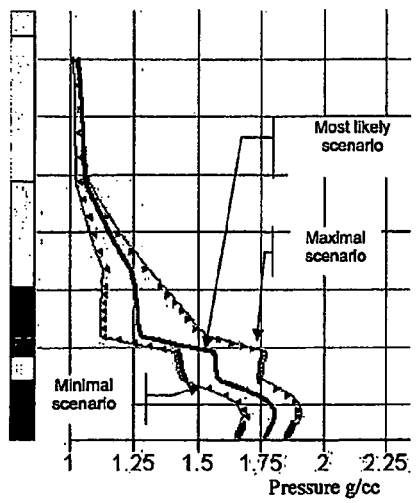
FIG. 14 illustrates step 1230 of the preferred embodiment of method 1200 of FIG. 12.

FIG. 14 illustrates the described prediction step 1230. Here, the most likely overpressure scenario corresponds to the model overpressure versus depth curve obtained by using the most likely model parameter vector estimated for the target well position within the calibrated earth model. The two extreme overpressure scenarios (FIG. 14) are based on possible model parameter variability within a subset of ϵ-equivalent inverse problem solutions (Tikhonov A. N. and Arsenin V. Y. Methods of solution of ill-posed problems, M., Nauka, 1979).

The last step 1240 of checking and, if necessary, updating the earth model, corresponding to the preferred embodiment of the while-drilling overpressure prediction method 1200, starts as soon as first while-drilling data can be made available for verification and correction (if necessary) of the 3D earth model.

The goal of this step is to keep the overpressure prediction ahead of the drill bit in accordance with the prediction data consistency requirements and to maintain the desired quality of the calibrated 3D earth model at neighboring wells.

Figure 15:
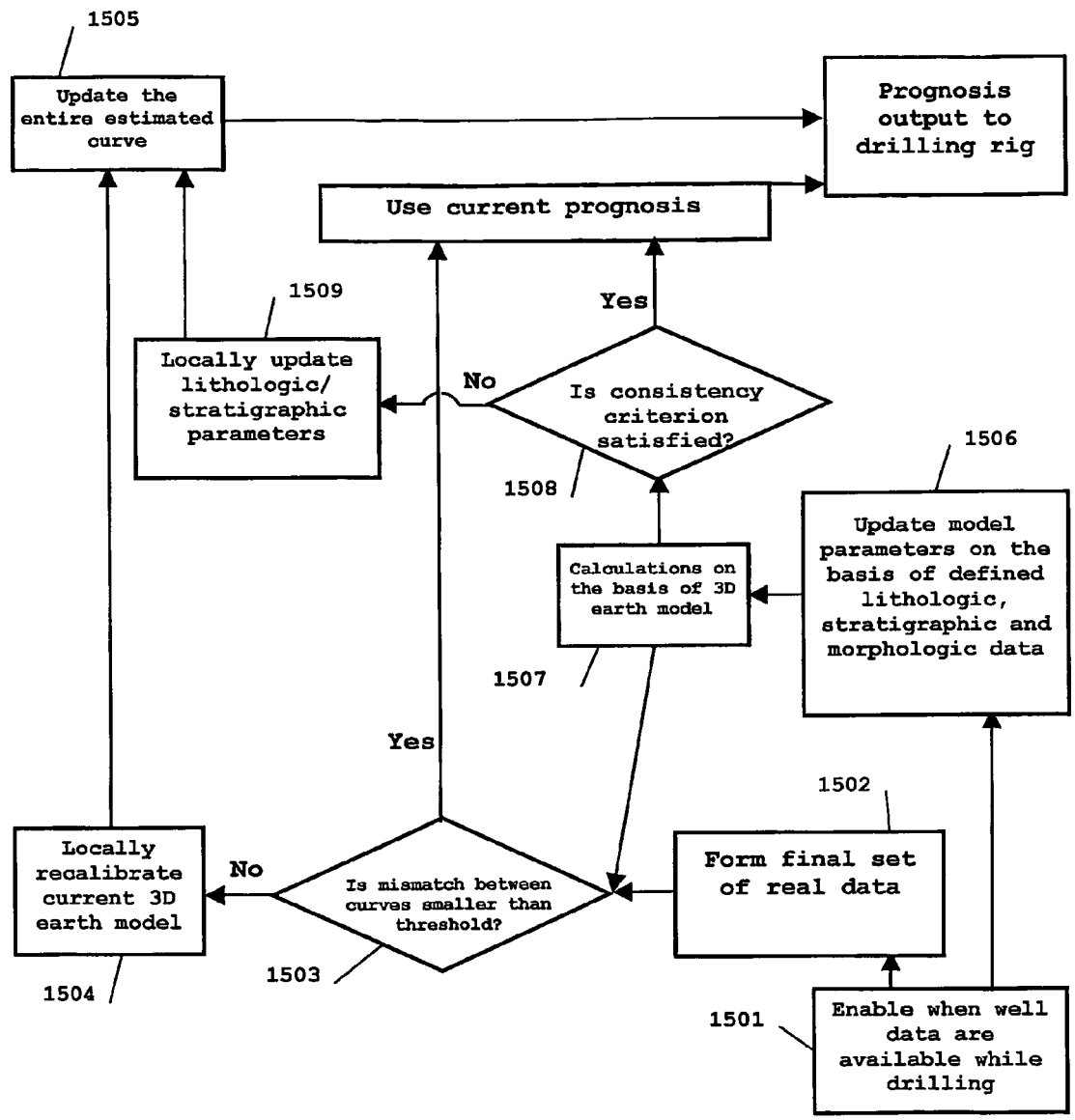
FIG. 15 shows a flow diagram of step 1240 of the preferred embodiment of method 1200 of FIG. 12.
Figure 16C:
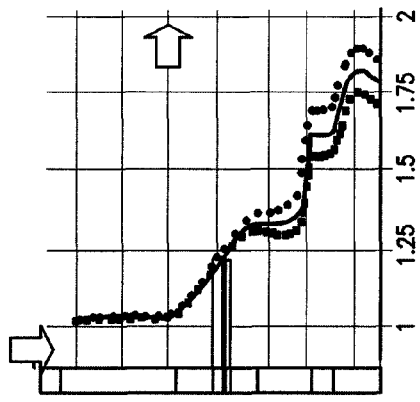
FIGS. 16a-16f show exemplary stages of overpressure prediction while drilling on the basis of the preferred embodiment of method 1200 of FIG. 12.
Figure 16F:
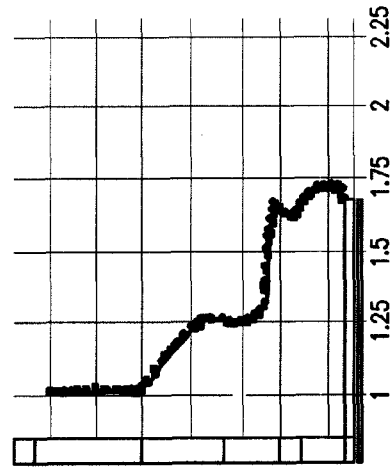
Figure 16B:
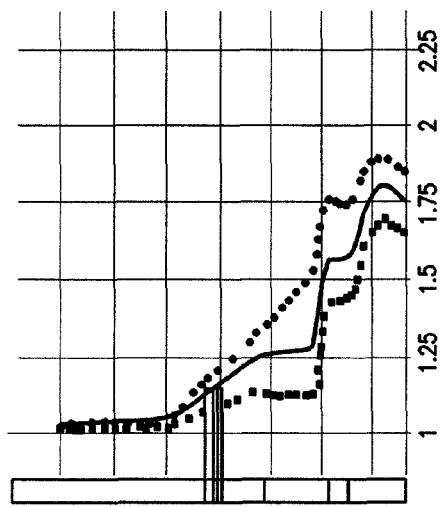
Figure 16E:
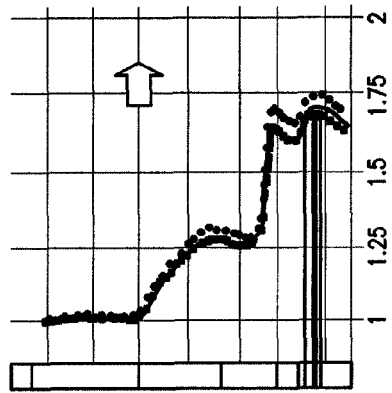
Figure 16A:
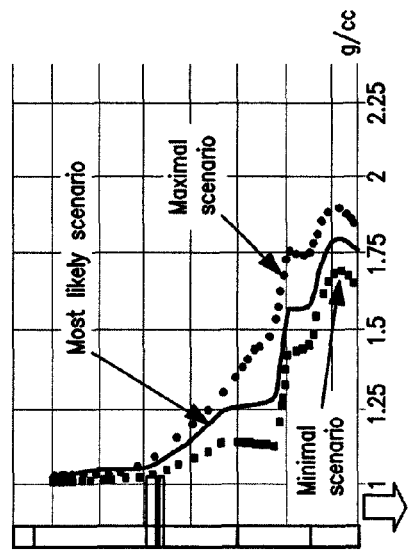
Figure 16D:
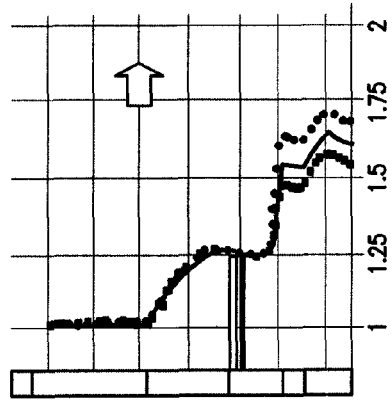

Main steps of a preferred embodiment of step 1240 will be described below with reference to FIG. 15. As noted above, in this step the 3D earth model in accordance with the invention recalibrated in step 1220 is used. Also, the overpressure curve is available before starting step 1240 as a preliminary prediction calculated in step 1230 at the target well position (i.e. where drilling will be actually be performed).

Step 1240 comprises continuously checking while drilling a match between the real overpressure and porosity curve obtained from log data gathered while drilling and the estimated overpressure and porosity curves calculated from said earth model.

Step 1240 is enabled by external process (step 1501) when the first data obtained directly while drilling is available. The data allows the current earth model to be checked for the target well position. It should be noted that the while-drilling data allows the real-time verification below the present drill bit position. Data gathered directly in the drilling process (measurement results, log data, indirect indicator interpretations, etc.) allow the generation of a single definite (final) set of real data and the comparison of the current earth model-based prediction with the final real data.

Thus, in step 1502 the final set of real data is obtained from interpretation of the gathered data, the final set being preferably in the form of real overpressure and porosity curves. It should be noted that step 1502 can be performed by any conventional means and methods for log data processing and interpretation.

Then, in step 1503 the mismatch between the estimated and real overpressure curves is determined, e.g. by calculating the mean-square vector norm for the difference between the real and estimated data vectors. If the so-defined mismatch does not exceed a predetermined threshold, the current prediction is used, otherwise the prediction is updated. To this end, in step 1504 the current 3D earth model is locally re-calibrated (with respect to data gathered directly in the target well) using the methods disclosed in the description of the preferred embodiment of the pre-calibration step 1220, in particular with the calculated mismatch being used as input to the inversion operator. The derived correction to the model parameters minimizes the mismatch within the available data.

Then in step 1505, the entire estimated overpressure curve is updated (i.e. not only in the drilled-out depth interval, but to a greater depth as well) by calculations based on the earth model re-calibrated in step 1504, thereby updating the prediction below the present drill bit position.

In addition to the prediction updating based on the real overpressure curve, a supplementary correction of the prediction can be carried out on the basis of while-drilling seismic and stratigraphic data and core analysis results. This correction takes into account the misfit between real section properties relating to lithology, stratigraphy and formation depths, and respective model parameters.

In step 1506, current formation lithology and stratigraphy are defined from the gathered data, and roof depth and morphology of the formation approached by the drill bit are recognized, thereby updating relevant parameters of the current 3D earth model. In step 1507, calculations are performed on the basis of the 3D earth model updated in step 1506, to obtain the updated estimated overpressure curve, and then the process proceeds to step 1503.

In this case, in addition to transition to step 1503 for performing the above check, the process proceeds from step 1507 to step 1508 to check whether the current earth model is consistent with the real well section being drilled. In the consistency check of step 1508, a mismatch between the available (before updating) estimated overpressure curve and the updated estimated curve obtained in step 1507 is determined. Preferably, the mismatch is calculated similarly to step 1503. If in step 1508 the calculated mismatch exceeds a predetermined threshold, i.e. a predetermined consistency criterion is not satisfied, the process proceeds to step 1509 in which the lithologic/stratigraphic parameters relating to the current formation are locally updated, and then transfers to step 1505. Otherwise, the current prediction is used.

FIGS. 16a-16f illustrate a sequence of stages (a-f) of the overpressure prediction in accordance with the approach described above. It should be noted that the transitions from stage a to stage b, and from stage e to stage f are not accompanied by prediction updating, while the remaining transitions involve said updating.

The preferred embodiment of the while-drilling overpressure prediction method 1200 can be practiced using a system described below with reference to FIG. 17.

Figure 17:
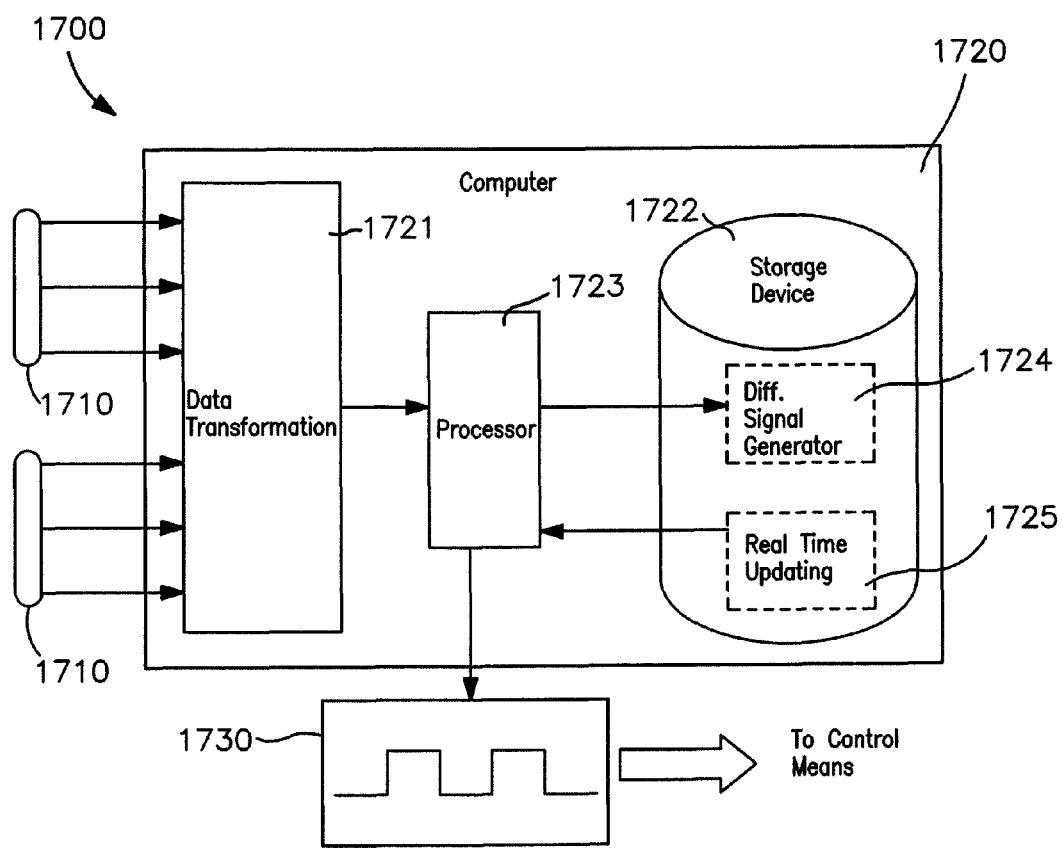
FIG. 17 shows a schematic diagram of a system for implementing the preferred embodiment of method 1200 of FIG. 12.

As seen in FIG. 17, the system 1700 includes one or more data acquisition devices 1710 to gather data while drilling (two devices 1719 are shown, although a person skilled in the art will appreciate that the system may include any number of data acquisition devices as required). The data acquisition devices 1710 may be any conventional devices, such as sensors, logging tools, etc., suitable for gathering data while drilling a target well and/or in offset wells. Data gathered by the data acquisition devices 1710 are transmitted by any conventional method (wire-line or wireless) to a computing device 1720 included in the system 1700.

Being essentially the main component of the system, the computing device 1720 is adapted to perform calculations in accordance with the steps of the preferred embodiment of the method 1200 based on the data gathered by the data acquisition device 1710. In addition, the computing device 1720 can perform supplementary processing of data gathered by the data acquisition devices 1710 in order to derive needed information and/or to present the gathered data in the form most suitable for inversion and further updating of the earth model.

The computing device 1720 is preferably a computer having a sufficient computing power, and the principal calculating steps of the preferred embodiment of the method 1200 are implemented in computer-executable software. The computer includes a data transformation device 1721 to transform the final set of data received from the data acquisition devices 1710 into the format used by the computer, at least one data storage device 1722 to store the software in the form of computer-executable instructions, and at least one processor 1723 to perform calculations by executing computer-executable instructions. In addition to the listed components, the computer includes other conventional components needed for its correct operation (not shown).

It should be noted that the described embodiment of a computing device 1720 is only an illustrative example, and calculations relevant to the steps of the preferred embodiment of the while-drilling overpressure prediction method 1200 can be implemented in another fashion, e.g. in hardware.

The computer 1720 includes the difference signal generation means 1724 (shown in FIG. 17 as a part of data storage 1722) comprising indications of the mismatch between the estimated and real overpressure curves, and real-time updating means 1725 for real-time updating the overpressure prediction ahead of the present drill bit position (shown at FIG. 17 as stored in data storage 1722). Means 1725 is enabled in response to the difference signal provided by the means 1724 and recalibrates the current earth model in real-time by correcting the model parameters in response to the difference signal. In light of the aforesaid, the difference signal forms input to the inversion operator described above with reference to FIG. 13 and realized in software. As a result, the means 1725 updates or amends the prediction of overpressure evolution below the present drill bit position by calculations based on the recalibrated earth model.

Although means 1724 and 1725 are shown in FIG. 17 as separate means, those skilled in the art will appreciate that the means can be implemented as single software complex.

In addition, the system 1700 comprises a control signal generation device 1730 for generating a signal comprising recommendations and instructions for adjusting the drilling process responsive to the results of real-time updating of the overpressure prediction below the present drill bit position performed by means 1724 and 1725 of the computing device 1720. The drilling process is adjusted in response to this signal either automatically or by an operator. Although in FIG. 17 the control signal generation device 1730 is shown as a device separate from the computing device 1720, those skilled in the art will appreciate that the device 1730 can be integrated in the computing device 1720.

The computer 1720 and the control signal generation device 1730 can be located either directly at the drilling rig, or remotely. As a consequence, the control signal at output of the device 1730 can be transmitted either to local or remote drilling process control means, depending on location of the devices 1720 and 1730, by any conventional (wire-line or wireless) method.

The foregoing description has been directed to particular embodiments of the invention for the purpose of illustrating the invention. It will be apparent to persons skilled in the art, however, that many alternatives, modifications, and variations to the embodiments described herein are possible without departing from the true scope of the invention.

The invention claimed is:

1. A computer implemented method for generating a 3D earth model for determining at least one characteristic of an area formed by a plurality of formations and comprising drilling positions of real or planned wells, the method comprising the steps of:

constructing, using a computer, an initial 3D earth model on the basis of measurement data and known properties of the area by combining solutions for a set of single 1D earth models with solutions for a set of 2D earth models, each of the 1D earth models corresponding to a drilling position of a real or a planned well and covering a number of formations along a bore of the respective well, and each of the 2D earth models covering a formation covered by at least one of the 1D earth models; and optimizing, using the computer, the constructed initial 3D earth model by:

(i) determining an optimal set of formations for each 1D earth model by analyzing an effect of each of the formations along the bore on the characteristic being determined and removing formations weakly affecting the characteristic being determined by merging those formations with host formations, and (ii) determining an optimal set of adjustable model parameters by analyzing an effect of 1D earth model parameters on the characteristic being determined and removing those parameters whose variations weakly affect the characteristic being determined.

2. The method as set forth in claim 1, wherein the step of determining an optimal set of adjustable model parameters comprises removing the parameters whose variations weakly affect the characteristic being determined by fixing said parameters at their most likely values.

3. The method as set forth in claim 1, wherein, in the step of constructing an initial 3D earth model, one or more of the 2D earth models contain structural elements corresponding to geological features of the formations covered by 2D earth models, and wherein the step of optimizing comprises analyzing the effect of the structural elements on the characteristic being determined and removing the structural elements weakly affecting the characteristic being determined.

4. The method as set forth in claim 1, wherein the step of optimizing comprises successively removing the formations on the basis of a sensitivity analysis by merging the formations with host formations.

5. The method as set forth in claim 4, wherein for each 1D earth model the step of successively removing formations comprises:
calibrating the 1D earth model by inverting measured well data;
calculating a sensitivity coefficient vector having a number of sensitivity coefficients equal to the number of formations along the bore of the respective well;
removing a formation corresponding to a lowest sensitivity coefficient of said sensitivity coefficients by merging said formation with a host formation; and
determining an error introduced by said removal; and
if the error is less than a predetermined modeling accuracy threshold, repeating the steps of calibrating the 1D earth model, calculating a sensitivity coefficient vector, removing a formation corresponding to a lowest sensitivity coefficient, determining an error introduced by said removal and checking if the error is less than a predetermined modeling accuracy threshold.

6. The method as set forth in claim 1, wherein the step of optimizing comprises removing model parameters to determine the optimal set of adjustable model parameters on the basis of a sensitivity analysis.

7. The method as set forth in claim 6, wherein said step of removing model parameters for each 1D earth model comprises:
calculating a sensitivity coefficient vector that has a number of sensitivity coefficients equal to a total number of model parameters for the optimal set of adjustable model parameters, and specifying an initial threshold value for the sensitivity coefficients;
removing the model parameters for which the corresponding sensitivity coefficients are less than the threshold value by fixing those parameters at their most likely values;
determining an error introduced by said removal; and
if the error is less than a predetermined modeling accuracy threshold, correcting the threshold value for the sensitivity coefficients until a permissible modeling error level is satisfied, and repeating the steps of calculating a sensitivity coefficient vector, removing the model parameters for which the corresponding sensitivity coefficients are less than the threshold value and determining an error introduced by said removal and checking if the error is less than a predetermined modeling accuracy threshold.

8. The method as set forth in claim 7, wherein the step of optimizing further comprises determining, from the optimal sets of formations for the 1D earth models, those laterally hydrodynamically-coupled formations to be included into the combined 3D earth model by recognizing, on the basis of analysis of the sensitivity coefficient vector calculated for the model parameters, the formations for which efficient lateral conduction of a target solution is highly sensitive.

9. The method as set forth in claim 1, wherein the characteristic being determined is overpressure, the formations for which the 2D earth models are constructed are laterally hydrodynamically-coupled formations, and any remaining formations are laterally water-impermeable.

10. The method as set forth in claim 9, wherein the step of constructing an initial 3D earth model applies a basin time scale, the step comprising:
specifying coordinates of drilling positions of the real or the planned wells and model parameters for a set of 1D earth models for the wells;
obtaining solutions of forward problems for the 1D earth models on the basis of the specified coordinates and the model parameters;
on the basis of the solutions obtained for the 1D earth models, determining parameters corresponding to intervals of the laterally hydrodynamically-coupled formations in the 1D models;
obtaining solutions of forward problems for the 2D earth models on a regular grid by interpolating said model parameters on said grid; and
constructing an initial combined 3D earth model and obtaining a 3D forward problem solution by combining the obtained solutions of forward problems for the 1D earth models and the obtained solutions of forward problems for the 2D earth models on the regular grid in the basin time scale.

11. The method as set forth in claim 10, wherein the step of constructing an initial 3D earth model comprises accounting for faults in the laterally hydrodynamically-coupled formations for which 2D earth models are constructed, and the step of optimizing further comprises analyzing an effect of fault segments on the overpressure being calculated and removing those segments weakly affecting the overpressure.

12. The method as set forth in claim 11, wherein the fault segments are removed on the basis of a sensitivity analysis.

13. The method as set forth in claim 12, wherein said step of removing the fault segments comprises:
calculating, for each 2D earth model and the respective laterally hydrodynamically-coupled formation, a sensitivity coefficient vector that has a number of sensitivity coefficients equal to a number of fault segments of said laterally hydrodynamically-coupled formation, and specifying an initial threshold value for the sensitivity coefficients;
removing those segments which have corresponding sensitivity coefficients that are smaller than the threshold value;
determining an error introduced by said removal; and
if the error is less than a predetermined modeling accuracy threshold, correcting the threshold value for the sensitivity coefficients until a permissible modeling error level is satisfied, and repeating the steps of calculating a sensitivity coefficient vector, removing those segments which have corresponding sensitivity coefficients that are smaller than the threshold value and determining an error introduced by said removal and checking if the error is less than a predetermined modeling accuracy threshold.

14. The method as set forth in claim 13, wherein the fault segments are removed by successively removing nodes of the regular grid used for modeling the laterally hydrodynamically-coupled formation.

15. A method for predicting overpressure while drilling, comprising the steps of:
    constructing a 3D earth model for an area in which drilling is performed, in accordance with a method of claim 9;
    pre-calibrating the constructed 3D earth model by joint inversion of measured well data, on the basis of data obtained from calibration wells and obtaining a set of model parameters for the 1D earth model;
    predicting overpressure at a target well position by obtaining a solution of a respective forward problem for the pre-calibrated 3D earth model;
    determining an actual overpressure from the measured data obtained while drilling and checking a match between the determined and predicted overpressures;
    if a mismatch between the predicted and the determined overpressures exceeds a predetermined threshold, updating the 3D earth model by obtaining a respective inverse problem solution and calculating from the updated 3D earth model an updated overpressure prediction below present drill bit position by obtaining a forward problem solution to the updated 3D earth model.

16. The method as set forth in claim 15, further comprising the step of adjusting a drilling process when the actual overpressure approaches a hazardous level below the present drill bit position, as determined from the updated overpressure prediction.

17. The method as set forth in claim 15, wherein the area comprises at least three calibration wells,
    the pre-calibration of the constructed 3D earth model being performed on the basis of the measured data gathered in said calibration wells, using at least one inversion operator; and
    the prediction of overpressure evolution comprising interpolating the set of model parameters obtained at the pre-calibration step for said calibration wells to the target well position and calculating an overpressure versus depth curve;
    and wherein said method further comprises:
    continuously checking the match between the calculated overpressure curve and an overpressure curve determined using measured data obtained in the drilling process and determining a mismatch between the calculated and the determined overpressure curves;
    if the mismatch between the calculated and the determined overpressure curves exceeds a predetermined threshold, updating the 3D earth model by re-calibration to minimize said mismatch, the mismatch being used as an input to the inversion operator, wherein an updated calculated overpressure curve calculated from the updated 3D earth model is used to update the overpressure prediction below the present drill bit position.

18. The method as set forth in claim 17, wherein the calculation of the overpressure versus depth curve further comprises calculating curves which restrict a range of permissible overpressure variability between maximal and minimal scenarios.

19. The method as set forth in claim 17, wherein the overpressure prediction is further updated on the basis of lithologic and stratigraphic data gathered while drilling and related to a current formation by updating the model parameters relevant to the target well on the basis of the data.

20. A system for predicting overpressure during a drilling process in accordance with the method of claim 17, comprising:
    at least one data acquisition device for gathering data while drilling;
    a computing device for performing calculations in accordance with the method and taking account of data gathered by said at least one data acquisition device, said computing device including:
    difference signal generation means for generating a difference signal comprising an indication of a mismatch between the calculated overpressure curve and the overpressure curve determined using measured data obtained in the drilling process; and
    prediction updating means for real-time updating of the overpressure prediction below the present drill bit position, said prediction updating means being enabled in response to said difference signal and adapted to recalibrate the 3D earth model in real-time by inputting said difference signal into the inversion operator, and to update the overpressure prediction by calculations on the basis of the re-calibrated 3D earth model;
    a control signal generation means for generating a control signal containing recommendations and instructions for adjusting the drilling process responsive to results of the real-time updating of the overpressure prediction below the present drill bit position performed by said computing device.

21. The system as set forth in claim 20, wherein data gathered by said at least one data acquisition device is further processed by the computing device to represent the data in a form most suitable for 3D earth model updating.

22. The system as set forth in claim 20, wherein said control signal generation means transmits the generated control signal to a local drilling process control means.

23. The system as set forth in claim 20, wherein said control signal generation means transmits the generated control signal to a remote drilling process control means.

24. The system as set forth in claim 20, wherein said control signal generation means is integrated into the computing device.

* * * * *